(12) United States Patent
Gass et al.

(10) Patent No.: US 7,788,999 B2
(45) Date of Patent: Sep. 7, 2010

(54) BRAKE MECHANISM FOR POWER EQUIPMENT

(75) Inventors: Stephen F. Gass, Wilsonville, OR (US); Joel F. Jensen, Redwood City, CA (US); Anwyl M. McDonald, Palo Alto, CA (US); David S. D'Ascenzo, Portland, OR (US); Andrew L. Johnston, Redwood City, CA (US)

(73) Assignee: SD3, LLC, Tualatin, OR (US)

( * ) Notice: Subject to any disclaimer, the term of this patent is extended or adjusted under 35 U.S.C. 154(b) by 891 days.

(21) Appl. No.: 11/401,050

(22) Filed: Apr. 10, 2006

(65) Prior Publication Data

US 2006/0179983 A1 Aug. 17, 2006

Related U.S. Application Data

(63) Continuation of application No. 09/929,241, filed on Aug. 31, 2001, now Pat. No. 7,024,975, application (Continued)

(51) Int. Cl.
*B26D 1/00* (2006.01)
*B27B 3/28* (2006.01)

(52) U.S. Cl. .................. 83/13; 83/58; 83/62.1; 83/477.2; 83/581; 83/DIG. 1

(58) Field of Classification Search .................... 83/58, 83/477.2, DIG. 1, 581, 62.1, 781, 490, 62, 83/477.1, 471, 639.1, 477, 74, 478, 397; 361/143, 364, 445; 318/364, 445; 307/39; 144/2.1

See application file for complete search history.

(56) References Cited

U.S. PATENT DOCUMENTS 146,886 A 1/1874 Doane et al.

(Continued)

FOREIGN PATENT DOCUMENTS

CA 2140991 1/1995

(Continued)

OTHER PUBLICATIONS

Skil Model 3400-Type 1 10" Table Saw Parts List and Technical Bulletin, S-B Power Tool Company, Jun. 1993.

(Continued)

*Primary Examiner*—Ghassem Alie

(57) ABSTRACT

Woodworking machines are disclosed having cutting tools adapted to cut workpieces. The machines include a detection system adapted to detect one or more dangerous conditions between a person and the cutting tool. The machines also include a brake mechanism having one or more braking components adapted to engage and stop the cutting tool in response to the detection of a dangerous condition.

16 Claims, 13 Drawing Sheets-

Related U.S. Application Data

No. 11/401,050, which is a continuation of application No. 09/676,190, filed on Sep. 29, 2000, now Pat. No. 7,055,417, application No. 11/401,050, which is a continuation of application No. 09/929,221, filed on Aug. 13, 2001, now Pat. No. 7,284,467, and a continuation of application No. 09/929,227, filed on Aug. 13, 2001, now Pat. No. 7,308,843, and a continuation of application No. 09/929,234, filed on Aug. 13, 2001, now Pat. No. 7,225,712, and a continuation of application No. 09/929,235, filed on Aug. 13, 2001, now Pat. No. 7,350,444, and a continuation of application No. 09/929,236, filed on Aug. 13, 2001, now Pat. No. 7,610,836, and a continuation of application No. 09/929,237, filed on Aug. 13, 2001, now Pat. No. 7,600,455, and a continuation of application No. 09/929,238, filed on Aug. 13, 2001, now abandoned, and a continuation of application No. 09/929,240, filed on Aug. 13, 2001, now Pat. No. 7,100,483, and a continuation of application No. 09/929,242, filed on Aug. 13, 2001, now Pat. No. 7,509,899, and a continuation of application No. 09/929,425, filed on Aug. 13, 2001, now Pat. No. 7,137,326, and a continuation of application No. 09/929,426, filed on Aug. 13, 2001, now Pat. No. 7,210,383, and a continuation of application No. 10/053,390, filed on Jan. 16, 2002, now Pat. No. 7,377,199, and a continuation of application No. 10/100,211, filed on Mar. 13, 2002, and a continuation of application No. 10/146,527, filed on May 15, 2002, and a continuation of application No. 10/172,553, filed on Jun. 13, 2002, now Pat. No. 7,231,856, and a continuation of application No. 10/189,027, filed on Jul. 2, 2002, now Pat. No. 7,712,403, and a continuation of application No. 10/189,031, filed on Jul. 2, 2002, now Pat. No. 7,171,879, and a continuation of application No. 10/243,042, filed on Sep. 13, 2002, now Pat. No. 7,197,969, and a continuation of application No. 10/292,607, filed on Nov. 12, 2002, now Pat. No. 7,077,039, and a continuation of application No. 10/341,260, filed on Jan. 13, 2003, now abandoned, and a continuation of application No. 10/345,630, filed on Jan. 15, 2003, now abandoned, and a continuation of application No. 10/643,296, filed on Aug. 18, 2003, now abandoned, and a continuation of application No. 10/794,161, filed on Mar. 4, 2004, now Pat. No. 7,098,800, and a continuation of application No. 10/923,273, filed on Aug. 20, 2004, now Pat. No. 7,350,445, and a continuation of application No. 10/923,282, filed on Aug. 20, 2004, now abandoned, and a continuation of application No. 10/923,290, filed on Aug. 20, 2004, now Pat. No. 7,472,634, and a continuation of application No. 10/923,339, filed on Sep. 1, 2004, now Pat. No. 7,290,472, and a continuation of application No. 10/984,643, filed on Nov. 8, 2004, and a continuation of application No. 11/026,006, filed on Dec. 31, 2004, and a continuation of application No. 11/026,114, filed on Dec. 31, 2004, now Pat. No. 7,707,920, and a continuation of application No. 11/027,254, filed on Dec. 31, 2004, now abandoned, and a continuation of application No. 11/027,322, filed on Dec. 31, 2004, now abandoned, application No. 11/027,600, filed on Dec. 31, 2004, now Pat. No. 7,536,238, and a continuation of application No. 11/045,972, filed on Jan. 28, 2005, and a continuation of application No. 11/061,162, filed on Feb. 18, 2005, now Pat. No. 7,228,772, and a continuation of application No. 11/098,984, filed on Apr. 4, 2005, now Pat. No. 7,353,737, and a continuation of application No. 11/107,499, filed on Apr. 15, 2005, now Pat. No. 7,481,140, and a continuation of application No. 11/190,111, filed on Jul. 25, 2005, now Pat. No. 7,357,056, and a continuation of application No. 11/208,214, filed on Aug. 19, 2005, and a continuation of application No. 11/218,356, filed on Sep. 2, 2005, now Pat. No. 7,621,205, and a continuation of application No. 11/256,757, filed on Oct. 24, 2005, and a continuation of application No. 11/348,580, filed on Feb. 6, 2006, now abandoned, and a continuation of application No. 11/353,423, filed on Feb. 13, 2006, now abandoned.

(60) Provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000, provisional application No. 60/157,340, filed on Oct. 1, 1999, provisional application No. 60/182,866, filed on Feb. 16, 2000, provisional application No. 60/667,485, filed on Mar. 31, 2005.

(56) References Cited

U.S. PATENT DOCUMENTS

| | | |
|---|---|---|
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 982,312 A | 1/1911 | Swafford |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,148,169 A | 7/1915 | Howe |
| 1,132,129 A | 9/1915 | Stevens |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |

| | | | | | |
|---|---|---|---|---|---|
| 1,324,136 A | 12/1919 | Turner | 2,554,124 A | 5/1951 | Salmont |
| 1,381,612 A | 6/1921 | Anderson | 2,562,396 A | 7/1951 | Schutz |
| 1,397,606 A | 11/1921 | Smith | 2,572,326 A | 10/1951 | Evans |
| 1,427,005 A | 8/1922 | McMichael | 2,590,035 A | 3/1952 | Pollak |
| 1,430,983 A | 10/1922 | Granberg | 2,593,596 A | 4/1952 | Olson |
| 1,450,906 A | 4/1923 | Anderson | 2,601,878 A | 7/1952 | Anderson |
| 1,464,924 A | 8/1923 | Drummond | 2,623,555 A | 12/1952 | Eschenburg |
| 1,465,224 A | 8/1923 | Lantz | 2,625,966 A | 1/1953 | Copp |
| 1,492,145 A | 4/1924 | Talley | 2,626,639 A | 1/1953 | Hess |
| 1,496,212 A | 6/1924 | French | 2,661,777 A | 12/1953 | Hitchcock |
| 1,511,797 A | 10/1924 | Berghold | 2,661,780 A | 12/1953 | Morgan |
| 1,526,128 A | 2/1925 | Flohr | 2,675,707 A | 4/1954 | Brown |
| 1,527,587 A | 2/1925 | Hutchinson | 2,678,071 A | 5/1954 | Odlum et al. |
| 1,551,900 A | 9/1925 | Morrow | 2,690,084 A | 9/1954 | Van Dam |
| 1,553,996 A | 9/1925 | Federer | 2,695,638 A | 11/1954 | Gaskell |
| 1,582,483 A | 4/1926 | Runyan | 2,704,560 A | 3/1955 | Woessner |
| 1,590,988 A | 6/1926 | Campbell | 2,711,762 A | 6/1955 | Gaskell |
| 1,600,604 A | 6/1926 | Sorlien | 2,719,547 A | 10/1955 | Gjerde |
| 1,616,478 A | 2/1927 | Watson | 2,722,246 A | 11/1955 | Arnoldy |
| 1,640,517 A | 8/1927 | Procknow | 2,731,049 A | 1/1956 | Akin |
| 1,662,372 A | 3/1928 | Ward | 2,736,348 A | 2/1956 | Nelson |
| 1,668,061 A | 5/1928 | Falkins | 2,737,213 A | 3/1956 | Richards et al. |
| 1,701,948 A | 2/1929 | Crowe | 2,758,615 A | 8/1956 | Mastriforte |
| 1,711,490 A | 5/1929 | Dummond | 2,785,710 A | 3/1957 | Mowery, Jr. |
| 1,712,828 A | 5/1929 | Klehm | 2,786,496 A | 3/1957 | Eschenburg |
| 1,774,521 A | 9/1930 | Neighbour | 2,804,890 A | 9/1957 | Fink |
| 1,807,120 A | 5/1931 | Lewis | 2,810,408 A | 10/1957 | Boice et al. |
| 1,811,066 A | 6/1931 | Tannewitz | 2,839,943 A | 6/1958 | Caldwell et al. |
| 1,879,280 A | 9/1932 | James | 2,844,173 A | 7/1958 | Gaskell |
| 1,896,924 A | 2/1933 | Ulrich | 2,850,054 A | 9/1958 | Eschenburg |
| 1,902,270 A | 3/1933 | Tate | 2,852,047 A | 9/1958 | Odlum et al. |
| 1,904,005 A | 4/1933 | Masset | 2,873,773 A | 2/1959 | Gaskell |
| 1,910,651 A | 5/1933 | Tautz | 2,876,809 A | 3/1959 | Rentsch et al. |
| 1,938,548 A | 12/1933 | Tautz | 2,883,486 A | 4/1959 | Mason |
| 1,938,549 A | 12/1933 | Tautz | 2,894,546 A | 7/1959 | Eschenburg |
| 1,963,688 A | 6/1934 | Tautz | 2,913,025 A | 11/1959 | Richards |
| 1,988,102 A | 1/1935 | Woodward | 2,913,581 A | 11/1959 | Simonton et al. |
| 1,993,219 A | 3/1935 | Merrigan | 2,937,672 A | 5/1960 | Gjerde |
| 2,007,887 A | 7/1935 | Tautz | 2,945,516 A | 7/1960 | Edgemond, Jr. et al. |
| 2,010,851 A | 8/1935 | Dummond | 2,954,118 A | 9/1960 | Anderson |
| 2,020,222 A | 11/1935 | Tautz | 2,957,166 A | 10/1960 | Gluck |
| 2,038,810 A | 4/1936 | Tautz | 2,978,084 A | 4/1961 | Vilkaitis |
| 2,075,282 A | 3/1937 | Hedgpeth | 2,984,268 A | 5/1961 | Vuichard |
| 2,095,330 A | 10/1937 | Hedgpeth | 2,991,593 A | 7/1961 | Cohen |
| 2,106,288 A | 1/1938 | Tautz | 3,005,477 A | 10/1961 | Sherwen |
| 2,106,321 A | 1/1938 | Guertin | 3,011,529 A | 12/1961 | Copp |
| 2,121,069 A | 6/1938 | Collins | 3,011,610 A | 12/1961 | Stiebel et al. |
| 2,131,492 A | 9/1938 | Ocenasek | 3,013,592 A | 12/1961 | Ambrosio et al. |
| 2,163,320 A | 6/1939 | Hammond | 3,021,881 A | 2/1962 | Edgemond, Jr. et al. |
| 2,168,282 A | 8/1939 | Tautz | 3,035,995 A | 5/1962 | Seeley et al. |
| 2,241,556 A | 5/1941 | MacMillin et al. | 3,047,116 A | 7/1962 | Stiebel et al. |
| 2,261,696 A | 11/1941 | Ocenasek | 3,085,602 A | 4/1963 | Gaskell |
| 2,265,407 A | 12/1941 | Tautz | 3,105,530 A | 10/1963 | Peterson |
| 2,286,589 A | 6/1942 | Tannewitz | 3,129,731 A | 4/1964 | Tyrrell |
| 2,292,872 A | 8/1942 | Eastman | 3,163,732 A | 12/1964 | Abbott |
| 2,299,262 A | 10/1942 | Uremovich | 3,184,001 A | 5/1965 | Reinsch et al. |
| 2,312,118 A | 2/1943 | Neisewander | 3,186,256 A | 6/1965 | Reznick |
| 2,313,686 A | 3/1943 | Uremovich | 3,207,273 A | 9/1965 | Jurin |
| 2,328,244 A | 8/1943 | Woodward | 3,213,731 A | 10/1965 | Renard |
| 2,352,235 A | 6/1944 | Tautz | 3,224,474 A | 12/1965 | Bloom |
| 2,377,265 A | 3/1945 | Rady | 3,232,326 A | 2/1966 | Speer et al. |
| 2,392,486 A | 1/1946 | Larsen | 3,246,205 A | 4/1966 | Miller |
| 2,402,232 A | 6/1946 | Baker | 3,249,134 A | 5/1966 | Vogl et al. |
| 2,425,331 A | 8/1947 | Kramer | 3,274,876 A | 9/1966 | Debus |
| 2,434,174 A | 1/1948 | Morgan | 3,276,497 A | 10/1966 | Heer |
| 2,452,589 A | 2/1948 | McWhirter et al. | 3,306,149 A | 2/1967 | John |
| 2,466,325 A | 4/1949 | Ocenasek | 3,313,185 A | 4/1967 | Drake et al. |
| 2,496,613 A | 2/1950 | Wooward | 3,315,715 A | 4/1967 | Mytinger |
| 2,501,134 A | 3/1950 | Meckoski et al. | 3,323,814 A | 6/1967 | Phillips |
| 2,509,813 A | 5/1950 | Dineen | 3,337,008 A | 8/1967 | Trachte |
| 2,517,649 A | 8/1950 | Frechtmann | 3,356,111 A | 12/1967 | Mitchell |
| 2,518,684 A | 8/1950 | Harris | 3,368,596 A | 2/1968 | Comer |
| 2,530,290 A | 11/1950 | Collins | 3,386,322 A | 6/1968 | Stone et al. |

| | | | | | | |
|---|---|---|---|---|---|---|
| 3,439,183 A | 4/1969 | Hurst, Jr. | 4,106,378 A | * | 8/1978 | Kaiser ............................ 83/74 |
| 3,445,835 A | 5/1969 | Fudaley | 4,117,752 A | | 10/1978 | Yoneda |
| 3,454,286 A | 7/1969 | Anderson et al. | 4,138,905 A | * | 2/1979 | Konishi ..................... 74/577 R |
| 3,456,696 A | 7/1969 | Gregory et al. | 4,145,940 A | | 3/1979 | Woloveke et al. |
| 3,512,440 A | 5/1970 | Frydmann | 4,152,833 A | | 5/1979 | Phillips |
| 3,538,964 A | 11/1970 | Warrick et al. | 4,161,649 A | | 7/1979 | Klos et al. |
| 3,540,338 A | 11/1970 | McEwan et al. | 4,175,452 A | | 11/1979 | Idel |
| 3,554,067 A | 1/1971 | Scutella | 4,184,394 A | | 1/1980 | Gjerde |
| 3,566,996 A | 3/1971 | Crossman | 4,190,000 A | | 2/1980 | Shaull et al. |
| 3,580,376 A | 5/1971 | Loshbough | 4,195,722 A | | 4/1980 | Anderson et al. |
| 3,581,784 A | 6/1971 | Warrick | 4,199,930 A | | 4/1980 | Lebet et al. |
| 3,593,266 A | 7/1971 | Van Sickle | 4,206,666 A | | 6/1980 | Ashton |
| 3,613,748 A | 10/1971 | De Pue | 4,206,910 A | | 6/1980 | Biesemeyer |
| 3,621,894 A | 11/1971 | Niksich | 4,249,117 A | | 2/1981 | Leukhardt et al. |
| 3,648,126 A | 3/1972 | Boos et al. | 4,249,442 A | | 2/1981 | Fittery |
| 3,670,788 A | 6/1972 | Pollak et al. | 4,251,599 A | | 2/1981 | McCormick |
| 3,675,444 A | 7/1972 | Whipple | 4,262,278 A | | 4/1981 | Howard et al. |
| 3,680,609 A | 8/1972 | Menge | 4,267,914 A | | 5/1981 | Saar |
| 3,688,815 A | 9/1972 | Ridenour | 4,270,427 A | | 6/1981 | Colberg et al. |
| 3,695,116 A | 10/1972 | Baur | 4,276,459 A | | 6/1981 | Willett et al. |
| 3,696,844 A | 10/1972 | Bernatschek | 4,276,799 A | | 7/1981 | Muehling |
| 3,716,113 A | 2/1973 | Kobayashi et al. | 4,288,048 A | * | 9/1981 | Sieben ..................... 242/338.3 |
| 3,719,103 A | 3/1973 | Streander | 4,291,794 A | | 9/1981 | Bauer |
| 3,740,000 A | * 6/1973 | Takada ....................... 242/384 | 4,305,442 A | | 12/1981 | Currie |
| 3,745,546 A | 7/1973 | Struger et al. | 4,319,146 A | | 3/1982 | Wires, Sr. |
| 3,749,933 A | 7/1973 | Davidson | 4,321,841 A | | 3/1982 | Felix |
| 3,754,493 A | 8/1973 | Niehaus et al. | 4,334,450 A | | 6/1982 | Benuzzi |
| 3,772,590 A | 11/1973 | Mikulecky et al. | 4,372,202 A | | 2/1983 | Cameron |
| 3,785,230 A | * 1/1974 | Lokey ........................ 30/388 | 4,374,552 A | * | 2/1983 | Dayen ...................... 188/72.9 |
| 3,793,915 A | 2/1974 | Huier | 4,385,539 A | | 5/1983 | Meyerhoefer et al. |
| 3,805,639 A | 4/1974 | Peter | 4,391,358 A | | 7/1983 | Haeger |
| 3,805,658 A | 4/1974 | Scott et al. | 4,418,597 A | | 12/1983 | Krusemark et al. |
| 3,808,932 A | 5/1974 | Russell | 4,427,042 A | | 1/1984 | Mitchell et al. |
| 3,829,850 A | 8/1974 | Guetersloh | 4,466,170 A | | 8/1984 | Davis |
| 3,829,970 A | 8/1974 | Anderson | 4,466,233 A | | 8/1984 | Thesman |
| 3,858,095 A | 12/1974 | Friemann et al. | 4,470,046 A | | 9/1984 | Betsill |
| 3,861,016 A | 1/1975 | Johnson et al. | 4,492,291 A | | 1/1985 | Chometon et al. |
| 3,863,208 A | 1/1975 | Balban | 4,503,739 A | | 3/1985 | Konieczka |
| 3,874,747 A | * 4/1975 | Case et al. .................... 303/89 | 4,510,489 A | | 4/1985 | Anderson, III et al. |
| 3,880,032 A | 4/1975 | Green | 4,512,224 A | | 4/1985 | Terauchi |
| 3,882,744 A | 5/1975 | McCarroll | 4,518,043 A | | 5/1985 | Anderson et al. |
| 3,886,413 A | 5/1975 | Dow et al. | 4,532,501 A | | 7/1985 | Hoffman |
| 3,889,567 A | 6/1975 | Sato et al. | 4,532,844 A | | 8/1985 | Chang et al. |
| 3,905,263 A | 9/1975 | Smith | 4,557,168 A | | 12/1985 | Tokiwa |
| 3,922,785 A | 12/1975 | Fushiya | 4,559,858 A | | 12/1985 | Laskowski et al. |
| 3,924,688 A | 12/1975 | Cooper et al. | 4,560,033 A | | 12/1985 | DeWoody et al. |
| 3,931,727 A | 1/1976 | Luenser | 4,566,512 A | | 1/1986 | Wilson |
| 3,935,777 A | 2/1976 | Bassett | 4,573,556 A | | 3/1986 | Andreasson |
| 3,945,286 A | 3/1976 | Smith | 4,576,073 A | | 3/1986 | Stinson |
| 3,946,631 A | 3/1976 | Malm | 4,589,047 A | | 5/1986 | Gaus et al. |
| 3,947,734 A | 3/1976 | Fyler | 4,589,860 A | | 5/1986 | Brandenstein et al. |
| 3,949,636 A | 4/1976 | Ball et al. | 4,599,597 A | | 7/1986 | Rotbart |
| 3,953,770 A | 4/1976 | Hayashi | 4,599,927 A | | 7/1986 | Eccardt et al. |
| 3,960,310 A | 6/1976 | Nussbaum | 4,606,251 A | | 8/1986 | Boileau |
| 3,967,161 A | 6/1976 | Lichtblau | 4,615,247 A | | 10/1986 | Berkeley |
| 3,974,565 A | 8/1976 | Ellis | 4,621,300 A | | 11/1986 | Summerer |
| 3,975,600 A | 8/1976 | Marston | 4,625,604 A | | 12/1986 | Handler et al. |
| 3,978,624 A | 9/1976 | Merkel et al. | 4,637,188 A | | 1/1987 | Crothers |
| 3,994,192 A | 11/1976 | Faig | 4,637,289 A | | 1/1987 | Ramsden |
| 4,007,679 A | 2/1977 | Edwards | 4,638,393 A | * | 1/1987 | Oishi et al. ............... 242/338.3 |
| 4,016,490 A | 4/1977 | Weckenmann et al. | 4,644,832 A | | 2/1987 | Smith |
| 4,026,174 A | 5/1977 | Fierro | 4,653,189 A | | 3/1987 | Andreasson |
| 4,026,177 A | 5/1977 | Lokey | 4,657,428 A | | 4/1987 | Wiley |
| 4,029,159 A | 6/1977 | Nymann | 4,661,797 A | | 4/1987 | Schmall |
| 4,047,156 A | 9/1977 | Atkins | 4,672,500 A | | 6/1987 | Tholome et al. |
| 4,048,886 A | 9/1977 | Zettler | 4,675,664 A | | 6/1987 | Cloutier et al. |
| 4,060,160 A | 11/1977 | Lieber | 4,679,719 A | | 7/1987 | Kramer |
| 4,070,940 A | 1/1978 | McDaniel et al. | 4,694,721 A | | 9/1987 | Brickner, Jr. |
| 4,075,961 A | 2/1978 | Harris | 4,718,229 A | | 1/1988 | Riley |
| 4,077,161 A | 3/1978 | Wyle et al. | 4,722,021 A | | 1/1988 | Hornung et al. |
| 4,085,303 A | 4/1978 | McIntyre et al. | 4,751,603 A | | 6/1988 | Kwan |
| 4,090,345 A | * 5/1978 | Harkness .................... 56/10.5 | 4,756,220 A | | 7/1988 | Olsen et al. |
| 4,091,698 A | 5/1978 | Obear et al. | 4,757,881 A | | 7/1988 | Jonsson et al. |

| | | | | | | |
|---|---|---|---|---|---|---|
| 4,774,866 A | | 10/1988 | Dehari et al. | 5,503,059 A | 4/1996 | Pacholok |
| 4,792,965 A | | 12/1988 | Morgan | 5,510,587 A | 4/1996 | Reiter |
| 4,805,504 A | | 2/1989 | Fushiya et al. | 5,510,685 A | 4/1996 | Grasselli |
| 4,819,501 A | * | 4/1989 | Kraus et al. ............... 74/538 | 5,513,548 A | 5/1996 | Garuglieri |
| 4,831,279 A | | 5/1989 | Ingraham | 5,531,147 A | 7/1996 | Serban |
| 4,840,135 A | | 6/1989 | Yamauchi | 5,534,836 A | 7/1996 | Schenkel et al. |
| 4,845,476 A | | 7/1989 | Rangeard et al. | 5,572,916 A | 11/1996 | Takano |
| 4,864,455 A | | 9/1989 | Shimomura et al. | 5,587,618 A | 12/1996 | Hathaway |
| 4,875,398 A | | 10/1989 | Taylor et al. | 5,592,353 A | 1/1997 | Shinohara et al. |
| 4,888,869 A | * | 12/1989 | Leatherman ............... 30/161 | 5,606,889 A | 3/1997 | Bielinski et al. |
| 4,896,607 A | | 1/1990 | Hall et al. | 5,619,896 A | 4/1997 | Chen |
| 4,906,962 A | | 3/1990 | Duimstra | 5,623,860 A | 4/1997 | Schoene et al. |
| 4,907,679 A | | 3/1990 | Menke | 5,647,258 A | 7/1997 | Brazell et al. |
| 4,934,233 A | | 6/1990 | Brundage et al. | 5,648,644 A | 7/1997 | Nagel |
| 4,936,876 A | | 6/1990 | Reyes | 5,659,454 A | 8/1997 | Vermesse |
| 4,937,554 A | | 6/1990 | Herman | 5,667,152 A | 9/1997 | Mooring |
| 4,962,685 A | | 10/1990 | Hagstrom | 5,671,633 A | 9/1997 | Wagner |
| 4,964,450 A | | 10/1990 | Hughes et al. | 5,695,306 A | 12/1997 | Nygren, Jr. |
| 4,965,909 A | | 10/1990 | McCullough et al. | 5,700,165 A | 12/1997 | Harris et al. |
| 4,975,798 A | | 12/1990 | Edwards et al. | 5,720,213 A | 2/1998 | Sberveglieri |
| 5,020,406 A | | 6/1991 | Sasaki et al. | 5,722,308 A | 3/1998 | Ceroll et al. |
| 5,025,175 A | | 6/1991 | Dubois, III | 5,724,875 A | 3/1998 | Meredith et al. |
| 5,042,348 A | | 8/1991 | Brundage et al. | 5,730,165 A | 3/1998 | Philipp |
| 5,046,426 A | | 9/1991 | Julien et al. | 5,741,048 A | 4/1998 | Eccleston |
| 5,052,255 A | | 10/1991 | Gaines | 5,755,148 A | 5/1998 | Stumpf et al. |
| 5,067,366 A | * | 11/1991 | Gandiglio ............... 74/535 | 5,768,786 A | 6/1998 | Kane et al. |
| 5,074,047 A | | 12/1991 | King | 5,771,742 A | 6/1998 | Bokaie et al. |
| 5,081,406 A | | 1/1992 | Hughes et al. | 5,782,001 A | 7/1998 | Gray |
| 5,082,316 A | | 1/1992 | Wardlaw | 5,787,779 A | 8/1998 | Garuglieri |
| 5,083,973 A | | 1/1992 | Townsend | 5,791,057 A | 8/1998 | Nakamura et al. |
| 5,086,890 A | | 2/1992 | Turczyn et al. | 5,791,223 A | 8/1998 | Lanzer |
| 5,094,000 A | | 3/1992 | Becht et al. | 5,791,224 A | 8/1998 | Suzuki et al. |
| 5,116,249 A | | 5/1992 | Shiotani et al. | 5,791,441 A | 8/1998 | Matos et al. |
| 5,119,555 A | | 6/1992 | Johnson | 5,797,307 A | 8/1998 | Horton |
| 5,122,091 A | | 6/1992 | Townsend | 5,819,619 A | 10/1998 | Miller et al. |
| 5,146,714 A | | 9/1992 | Liiber | 5,819,625 A | 10/1998 | Sberveglieri |
| 5,174,349 A | | 12/1992 | Svetlik et al. | 5,852,951 A | 12/1998 | Santi |
| 5,184,534 A | | 2/1993 | Lee | 5,857,507 A | 1/1999 | Puzio et al. |
| 5,198,702 A | | 3/1993 | McCullough et al. | 5,861,809 A | 1/1999 | Eckstein et al. |
| 5,199,343 A | | 4/1993 | O'Banion | 5,875,698 A | 3/1999 | Ceroll et al. |
| 5,201,110 A | | 4/1993 | Bane | 5,880,954 A | 3/1999 | Thomson et al. |
| 5,201,684 A | | 4/1993 | DeBois, III | 5,921,367 A | 7/1999 | Kashioka et al. |
| 5,206,625 A | | 4/1993 | Davis | 5,927,857 A | 7/1999 | Ceroll et al. |
| 5,207,253 A | | 5/1993 | Hoshino et al. | 5,930,096 A | 7/1999 | Kim |
| 5,212,621 A | | 5/1993 | Panter | 5,937,720 A | 8/1999 | Itzov |
| 5,218,189 A | | 6/1993 | Hutchison | 5,942,975 A | 8/1999 | Sorensen |
| 5,231,359 A | | 7/1993 | Masuda et al. | 5,943,932 A | 8/1999 | Sberveglieri |
| 5,231,906 A | | 8/1993 | Kogej | 5,950,514 A | 9/1999 | Benedict et al. |
| 5,239,879 A | | 8/1993 | Plangetis | 5,963,173 A | 10/1999 | Lian et al. |
| 5,245,879 A | | 9/1993 | McKeon | 5,974,927 A | * 11/1999 | Tsune ............... 83/490 |
| 5,257,570 A | | 11/1993 | Shiotani et al. | 5,989,116 A | 11/1999 | Johnson et al. |
| 5,265,510 A | | 11/1993 | Hoyer-Ellefsen | 6,009,782 A | 1/2000 | Tajima et al. |
| 5,272,946 A | | 12/1993 | McCullough et al. | 6,018,284 A | 1/2000 | Rival et al. |
| 5,276,431 A | | 1/1994 | Piccoli et al. | 6,037,729 A | 3/2000 | Woods et al. |
| 5,285,708 A | | 2/1994 | Bosten et al. | D422,290 S | 4/2000 | Welsh et al. |
| 5,293,802 A | | 3/1994 | Shiotani et al. | 6,052,884 A | 4/2000 | Steckler et al. |
| 5,320,382 A | | 6/1994 | Goldstein et al. | 6,062,121 A | 5/2000 | Ceroll et al. |
| 5,321,230 A | | 6/1994 | Shanklin et al. | 6,070,484 A | 6/2000 | Sakamaki |
| 5,331,875 A | | 7/1994 | Mayfield | 6,095,092 A | 8/2000 | Chou |
| 5,353,670 A | | 10/1994 | Metzger, Jr. | 6,112,785 A | 9/2000 | Yu |
| 5,377,554 A | | 1/1995 | Reulein et al. | 6,119,984 A | 9/2000 | Devine |
| 5,377,571 A | | 1/1995 | Josephs | 6,131,629 A | 10/2000 | Puzio et al. |
| 5,392,568 A | | 2/1995 | Howard, Jr. et al. | 6,133,818 A | 10/2000 | Hsieh et al. |
| 5,392,678 A | | 2/1995 | Sasaki et al. | 6,141,192 A | 10/2000 | Garzon |
| 5,401,928 A | | 3/1995 | Kelley | 6,148,504 A | 11/2000 | Schmidt et al. |
| 5,411,221 A | | 5/1995 | Collins et al. | 6,148,526 A | 11/2000 | Kirn et al. |
| 5,423,232 A | | 6/1995 | Miller et al. | 6,148,703 A | 11/2000 | Ceroll et al. |
| 5,436,613 A | | 7/1995 | Ghosh et al. | 6,150,826 A | 11/2000 | Hokodate et al. |
| 5,447,085 A | | 9/1995 | Gochnauer | 6,161,459 A | 12/2000 | Ceroll et al. |
| 5,451,750 A | | 9/1995 | An | 6,170,370 B1 | 1/2001 | Sommerville |
| 5,453,903 A | | 9/1995 | Chow | 6,244,149 B1 | 6/2001 | Ceroll et al. |
| 5,471,888 A | | 12/1995 | McCormick | 6,250,190 B1 | 6/2001 | Ceroll et al. |
| 5,480,009 A | | 1/1996 | Wieland et al. | 6,257,061 B1 | 7/2001 | Nonoyama et al. |

| | | | | | | |
|---|---|---|---|---|---|---|
| 6,283,002 | B1 | 9/2001 | Chiang | 6,997,090 B2 | 2/2006 | Gass et al. |
| 6,295,910 | B1 | 10/2001 | Childs et al. | 7,000,514 B2 | 2/2006 | Gass et al. |
| 6,312,028 | B1 | 11/2001 | Wilkosz | 7,024,975 B2 | 4/2006 | Gass et al. |
| 6,325,195 | B1 | 12/2001 | Doherty | 7,055,417 B1 | 6/2006 | Gass et al. |
| 6,330,848 | B1 | 12/2001 | Nishio et al. | 7,077,039 B2 | 7/2006 | Gass et al. |
| 6,336,273 | B1 | 1/2002 | Nilsson et al. | 7,098,800 B2 | 8/2006 | Gass |
| 6,352,137 | B1 | 3/2002 | Stegall et al. | 7,100,483 B2 | 9/2006 | Gass et al. |
| 6,357,328 | B1 | 3/2002 | Ceroll et al. | 2002/0017175 A1 | 2/2002 | Gass et al. |
| 6,361,092 | B1 | 3/2002 | Eagle et al. | 2002/0017176 A1 | 2/2002 | Gass et al. |
| 6,366,099 | B1 | 4/2002 | Reddi | 2002/0017178 A1 | 2/2002 | Gass et al. |
| 6,376,939 | B1 | 4/2002 | Suzuki et al. | 2002/0017179 A1 | 2/2002 | Gass et al. |
| 6,404,098 | B1 | 6/2002 | Kayama et al. | 2002/0017180 A1 | 2/2002 | Gass et al. |
| 6,405,624 | B2 | 6/2002 | Sutton | 2002/0017181 A1 | 2/2002 | Gass et al. |
| 6,418,829 | B1 | 7/2002 | Pilchowski | 2002/0017182 A1 | 2/2002 | Gass et al. |
| 6,420,814 | B1 | 7/2002 | Bobbio | 2002/0017184 A1 | 2/2002 | Gass et al. |
| 6,427,570 | B1 | 8/2002 | Miller et al. | 2002/0017336 A1 | 2/2002 | Gass et al. |
| 6,430,007 | B1 | 8/2002 | Jabbari | 2002/0020261 A1 | 2/2002 | Gass et al. |
| 6,431,425 | B1 | 8/2002 | Moorman et al. | 2002/0020262 A1 | 2/2002 | Gass et al. |
| 6,450,077 | B1 | 9/2002 | Ceroll et al. | 2002/0020263 A1 | 2/2002 | Gass et al. |
| 6,453,786 | B1 | 9/2002 | Ceroll et al. | 2002/0020271 A1 | 2/2002 | Gass et al. |
| 6,460,442 | B2 | 10/2002 | Talesky et al. | 2002/0043776 A1 | 4/2002 | Chuang |
| 6,471,106 | B1 | 10/2002 | Reining | 2002/0050201 A1 | 5/2002 | Lane et al. |
| 6,479,958 | B1 | 11/2002 | Thompson et al. | 2002/0056349 A1 | 5/2002 | Gass et al. |
| 6,484,614 | B1 | 11/2002 | Huang | 2002/0059853 A1 | 5/2002 | Gass et al. |
| D466,913 | S | 12/2002 | Ceroll et al. | 2002/0059854 A1 | 5/2002 | Gass et al. |
| 6,492,802 | B1 | 12/2002 | Bielski | 2002/0069734 A1 | 6/2002 | Gass et al. |
| D469,354 | S | 1/2003 | Curtsinger | 2002/0088325 A1 | 7/2002 | Talesky et al. |
| 6,502,493 | B1 | 1/2003 | Eccardt et al. | 2002/0096030 A1 | 7/2002 | Wang |
| 6,536,536 | B1 | 3/2003 | Gass et al. | 2002/0096591 A1* | 7/2002 | Tanji ....................... 242/390.8 |
| 6,543,324 | B2 | 4/2003 | Dils | 2002/0109036 A1 | 8/2002 | Denen et al. |
| 6,546,835 | B2 | 4/2003 | Wang | 2002/0134212 A1 | 9/2002 | Ceroll et al. |
| 6,564,909 | B1 | 5/2003 | Razzano | 2002/0170399 A1 | 11/2002 | Gass et al. |
| 6,575,067 | B2 | 6/2003 | Parks et al. | 2002/0170400 A1 | 11/2002 | Gass |
| 6,578,460 | B2 | 6/2003 | Sartori | 2002/0174755 A1 | 11/2002 | Behne et al. |
| 6,578,856 | B2 | 6/2003 | Kahle | 2002/0190581 A1 | 12/2002 | Gass et al. |
| 6,581,655 | B2 | 6/2003 | Huang | 2003/0000359 A1 | 1/2003 | Eccardt et al. |
| 6,595,096 | B2 | 7/2003 | Ceroll et al. | 2003/0002942 A1 | 1/2003 | Gass et al. |
| D478,917 | S | 8/2003 | Ceroll et al. | 2003/0005588 A1 | 1/2003 | Gass et al. |
| 6,601,493 | B1 | 8/2003 | Crofutt | 2003/0015253 A1 | 1/2003 | Gass et al. |
| 6,607,015 | B1 | 8/2003 | Chen | 2003/0037651 A1 | 2/2003 | Gass et al. |
| D479,538 | S | 9/2003 | Welsh et al. | 2003/0037655 A1 | 2/2003 | Chin-Chin |
| 6,617,720 | B1 | 9/2003 | Egan, III et al. | 2003/0056853 A1 | 3/2003 | Gass et al. |
| 6,619,348 | B2 | 9/2003 | Wang | 2003/0058121 A1 | 3/2003 | Gass et al. |
| 6,640,683 | B2 | 11/2003 | Lee | 2003/0074873 A1 | 4/2003 | Freiberg et al. |
| 6,644,157 | B2 | 11/2003 | Huang | 2003/0089212 A1 | 5/2003 | Parks et al. |
| 6,647,847 | B2 | 11/2003 | Hewitt et al. | 2003/0090224 A1 | 5/2003 | Gass et al. |
| 6,659,233 | B2 | 12/2003 | DeVlieg | 2003/0101857 A1 | 6/2003 | Chuang |
| 6,684,750 | B2 | 2/2004 | Yu | 2003/0109798 A1 | 6/2003 | Kermani |
| 6,722,242 | B2 | 4/2004 | Chuang | 2003/0131703 A1 | 7/2003 | Gass et al. |
| 6,734,581 | B1 | 5/2004 | Griffis | 2003/0140749 A1 | 7/2003 | Gass et al. |
| 6,736,042 | B2 | 5/2004 | Behne et al. | 2003/0213349 A1 | 11/2003 | Chang |
| 6,742,430 | B2 | 6/2004 | Chen | 2004/0011177 A1 | 1/2004 | Huang |
| 6,796,208 | B1 | 9/2004 | Jorgensen | 2004/0040426 A1 | 3/2004 | Gass et al. |
| 6,800,819 | B2 | 10/2004 | Sato et al. | 2004/0060404 A1 | 4/2004 | Metzger, Jr. |
| 6,826,988 | B2 | 12/2004 | Gass et al. | 2004/0104085 A1 | 6/2004 | Lang et al. |
| 6,826,992 | B1 | 12/2004 | Huang | 2004/0159198 A1 | 8/2004 | Peot et al. |
| 6,840,144 | B2 | 1/2005 | Huang | 2004/0194594 A1 | 10/2004 | Dils et al. |
| 6,854,371 | B2 | 2/2005 | Yu | 2004/0200329 A1 | 10/2004 | Sako |
| 6,857,345 | B2 | 2/2005 | Gass et al. | 2004/0226424 A1 | 11/2004 | O'Banion et al. |
| 6,874,397 | B2 | 4/2005 | Chang | 2004/0226800 A1 | 11/2004 | Pierga et al. |
| 6,874,399 | B2 | 4/2005 | Lee | 2004/0255745 A1 | 12/2004 | Peot et al. |
| 6,877,410 | B2 | 4/2005 | Gass et al. | 2005/0057206 A1 | 3/2005 | Uneyama |
| 6,880,440 | B2 | 4/2005 | Gass et al. | 2005/0066784 A1 | 3/2005 | Gass |
| 6,883,397 | B2 | 4/2005 | Kimizuka | 2005/0092149 A1 | 5/2005 | Hartmann |
| 6,889,585 | B1 | 5/2005 | Harris et al. | 2005/0139051 A1 | 6/2005 | Gass et al. |
| 6,920,814 | B2 | 7/2005 | Gass et al. | 2005/0139056 A1 | 6/2005 | Gass et al. |
| 6,922,153 | B2 | 7/2005 | Pierga et al. | 2005/0139057 A1 | 6/2005 | Gass et al. |
| 6,945,148 | B2 | 9/2005 | Gass et al. | 2005/0139058 A1 | 6/2005 | Gass et al. |
| 6,945,149 | B2 | 9/2005 | Gass et al. | 2005/0139459 A1 | 6/2005 | Gass et al. |
| 6,957,601 | B2 | 10/2005 | Gass et al. | 2005/0155473 A1 | 7/2005 | Gass |
| 6,968,767 | B2 | 11/2005 | Yu | 2005/0166736 A1 | 8/2005 | Gass et al. |
| 6,986,370 | B1 | 1/2006 | Schoene et al. | 2005/0178259 A1 | 8/2005 | Gass et al. |
| 6,994,004 | B2 | 2/2006 | Gass et al. | 2005/0204885 A1 | 9/2005 | Gass et al. |

| | | | |
|---|---|---|---|
| 2005/0211034 A1 | 9/2005 | Sasaki et al. | |
| 2005/0235793 A1 | 10/2005 | O'Banion et al. | |
| 2005/0274432 A1 | 12/2005 | Gass et al. | |
| 2006/0000337 A1 | 1/2006 | Gass | |
| 2006/0032352 A1 | 2/2006 | Gass et al. | |
| 2006/0123960 A1 | 6/2006 | Gass et al. | |
| 2006/0123964 A1 | 6/2006 | Gass et al. | |
| 2006/0179983 A1 | 8/2006 | Gass et al. | |
| 2006/0219076 A1 | 10/2006 | Gass et al. | |
| 2006/0225551 A1 | 10/2006 | Gass | |
| 2006/0230896 A1 | 10/2006 | Gass | |

FOREIGN PATENT DOCUMENTS

| | | |
|---|---|---|
| CH | 297525 | 6/1954 |
| DE | 76186 | 8/1921 |
| DE | 2917497 | 4/1979 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |
| JP | 06328359 A | 11/1994 |

OTHER PUBLICATIONS

Shop Fox® Fence Operating Manual, Woodstock International, Inc., 1996, revised May 1997.
Gordon Engineering Corp., Product Catalog, pp. cover, 1, 3 and back, Brookfield, Connecticut, US, Oct. 1997.
Analog Devices, Inc., 3-Axis Capacitive Sensor—Preliminary Technical Data AD7103, pp. 1-40, © 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Tablesaw Splitters and Blade Covers, *Fine Woodworking*, pp. 77-81, Dec. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
Accu-Fence® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Young Inventor: Teen's Device Earns Her Trip to Science Fair, *The Arizona Republic*, May 5, 2006.
Operator Injury Mitigation Using Electronic Sensing and Mechanical Braking and Decoupling Devices in Handheld Circular Saws, Erin F. Eppard, date unknown.
*You Should Have Invented It*, French television show video.
Laguna Tools table saw owner's manual, date unknown.
Craftsman® Power and Hand Tools, pp. 142-143, 2003.

\* cited by examiner

BRAKE MECHANISM FOR POWER EQUIPMENT

CROSS-REFERENCE TO RELATED APPLICATIONS

This application is a continuation of U.S. patent application Ser. No. 09/929,241 filed Aug. 13, 2001 now U.S. Pat. No. 7,024,975, which claims the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000.

This application is also a continuation of U.S. patent application Ser. No. 09/676,190, filed Sep. 29, 2000 now U.S. Pat. No. 7,055,417, which claims the benefit of and priority from U.S. Provisional Patent Application Ser. No. 60/157,340, filed Oct. 1, 1999 and U.S. Provisional Patent Application Ser. No. 60/182,866, filed Feb. 16, 2000.

This application is also a continuation of the following U.S. patent applications: Ser. No. 09/929,221, filed Aug. 13, 2001 now U.S. Pat. No. 7,284,467, Ser. No. 09/929,227, filed Aug. 13, 2001 now U.S. Pat. No. 7,308,843, Ser. No. 09/929,234, filed Aug. 13, 2001 now U.S. Pat. No. 7,225,712, Ser. No. 09/929,235, filed Aug. 13, 2001 now U.S. Pat. No. 7,350,444, Ser. No. 09/929,236, filed Aug. 13, 2001 now U.S. Pat. No. 7,610,836, Ser. No. 09/929,237, filed Aug. 13, 2001 now U.S. Pat. No. 7,600,455, Ser. No. 09/929,238, filed Aug. 13, 2001 now abandoned, Ser. No. 09/929,240, filed Aug. 13, 2001 now U.S. Pat. No. 7,100,483, Ser. No. 09/929,242, filed Aug. 13, 2001 now U.S. Pat. No. 7,509,899, Ser. No. 09/929,425, filed Aug. 13, 2001 now U.S. Pat. No. 7,137,326, Ser. No. 09/929,426, filed Aug. 13, 2001 now U.S. Pat. No. 7,210,383, Ser. No. 10/053,390, filed Jan. 16, 2002 now U.S. Pat. No. 7,377,199, Ser. No. 10/100,211, filed Mar. 13, 2002, Ser. No. 10/146,527, filed May 15, 2002, Ser. No. 10/172,553, filed Jun. 13, 2002 now U.S. Pat. No. 7,231,856, Ser. No. 10/189,027, filed Jul. 2, 2002 now U.S. Pat. No. 7,712,403, Ser. No. 10/189,031, filed Jul. 2, 2002 now U.S. Pat. No. 7,171,879, Ser. No. 10/243,042, filed Sep. 13, 2002 now U.S. Pat. No. 7,197,969, Ser. No. 10/292,607, filed Nov. 12, 2002 now U.S. Pat. No. 7,077,039, Ser. No. 10/341,260, filed Jan. 13, 2003 now abandoned, Ser. No. 10/345,630, filed Jan. 15, 2003 now abandoned, Ser. No. 10/643,296, filed Aug. 18, 2003 now abandoned, Ser. No. 10/794,161, filed Mar. 4, 2004 now U.S. Pat. No. 7,098,800, Ser. No. 10/923,273, filed Aug. 20, 2004 now U.S. Pat. No 7,350,455, Ser. No. 10/923,282, filed Aug. 20, 2004 now abandoned, Ser. No. 10/923,290, filed Aug. 20, 2004 now U.S. Pat. No. 7,472,634, Ser. No. 10/932,339, filed Sep. 1, 2004 now U.S. Pat. No. 7,290,472, Ser. No. 10/984,643, filed Nov. 8, 2004, Ser. No. 11/026,006, filed Dec. 31, 2004, Ser. No. 11/026,114, filed Dec. 31, 2004 now U.S. Pat. No. 7,707,920, Ser. No. 11/027,254, filed Dec. 31, 2004 now abandoned, Ser. No. 11/027,322, filed Dec. 31, 2004 now abandoned, Ser. No. 11/027,600, filed Dec. 31, 2004 now U.S. Pat. No. 7,536,238, Ser. No. 11/045,972, filed Jan. 28, 2005, Ser. No. 11/061,162, filed Feb. 18, 2005 now U.S. Pat. No. 7,228,772, Ser. No. 11/098,984, filed Apr. 4, 2005 now U.S. Pat. No. 7,353,737, Ser. No. 11/107,499, filed Apr. 15, 2005 now U.S. Pat. No. 7,481,140, Ser. No. 11/190,111, filed Jul. 25, 2005 now U.S. Pat. No. 7,357,056, Ser. No. 11/208,214, filed Aug. 19, 2005, Ser. No. 11/218,356, filed Sep. 2, 2005 now U.S. Pat. No. 7,621,205, Ser. No. 11/256,757, filed Oct. 24, 2005, Ser. No. 11/348,580, filed Feb. 6, 2006 now abandoned, Ser. No. 11/353,423, filed Feb. 13, 2006 now abandoned, and Ser. No. 60/667,485, filed Mar. 31, 2006.

All of the above applications are hereby incorporated by reference in their entirety for all purposes.

FIELD

The present invention relates to safety systems for power equipment, and more particularly to a brake mechanism for use on power equipment, such as woodworking machines.

BACKGROUND

Safety systems are often employed with power equipment such as table saws, miter saws, band saws, jointers, shapers, circular saws and other woodworking machinery, to minimize the risk of injury when using the equipment. Probably the most common safety feature is a guard that physically blocks an operator from making contact with dangerous components of machinery, such as belts, shafts or blades. In many cases, guards effectively reduce the risk of injury, however, there are many instances where the nature of the operations to be performed precludes using a guard that completely blocks access to hazardous machine parts.

The present invention discloses a safety system, and power equipment incorporating a safety system, that includes a brake mechanism adapted to engage the blade or other cutting tool to protect the user against serious injury if a dangerous, or triggering, condition, such as contact between the user's body and the blade or other cutting tool, occurs. The brake mechanism includes a pawl that is biased to engage and quickly stop the blade or other cutting tool.

DETAILED DESCRIPTION

Figure 1:
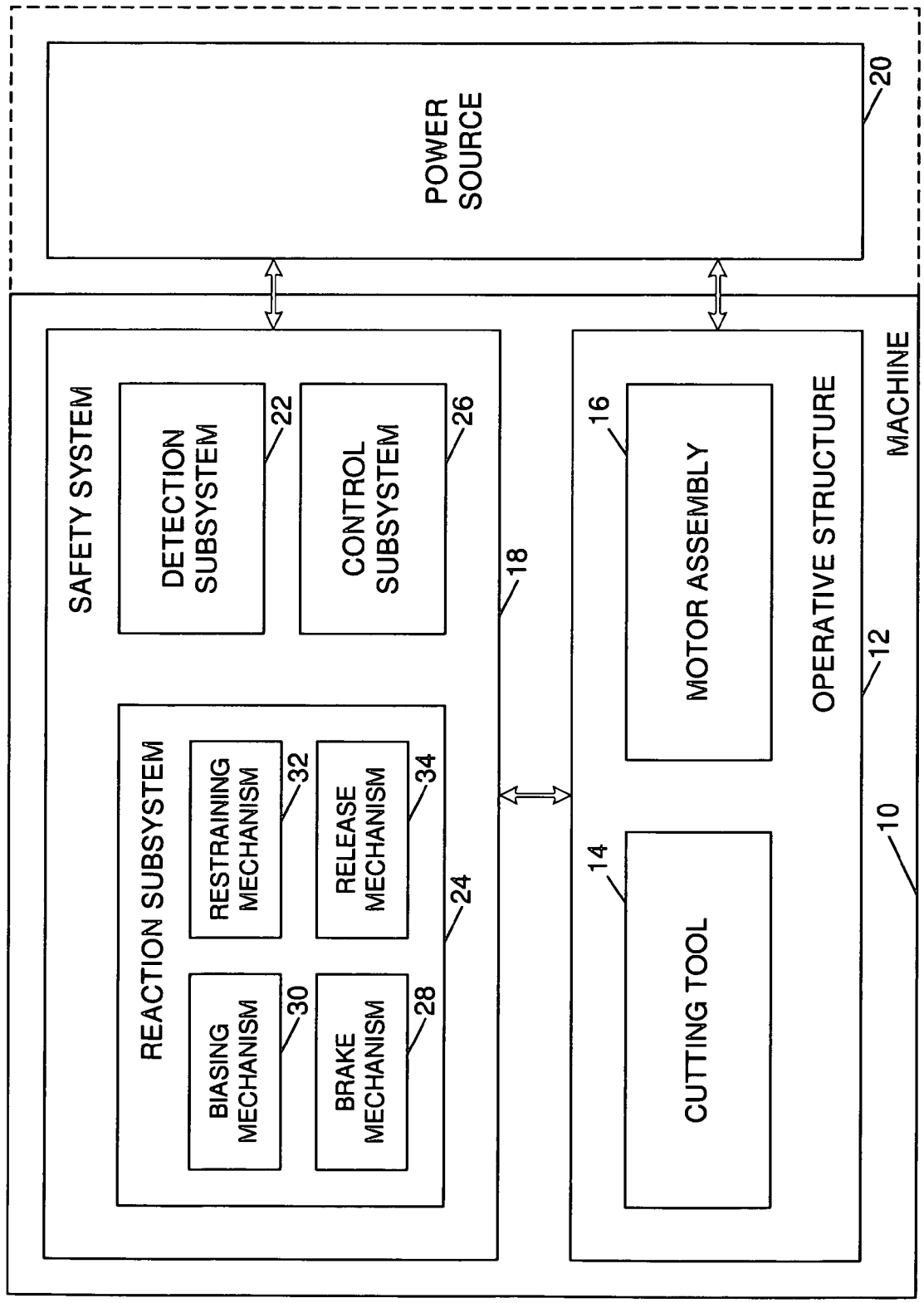
FIG. 1 is a schematic block diagram of a machine with a fast-acting safety system according to the present invention.

A machine is generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous, or triggering, conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference. Retraction of the cutting tool from its operating position is described in more detail in U.S. Provisional Patent Application Ser. No. 60/225,089, entitled "Retraction System For Use In Power Equipment," filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
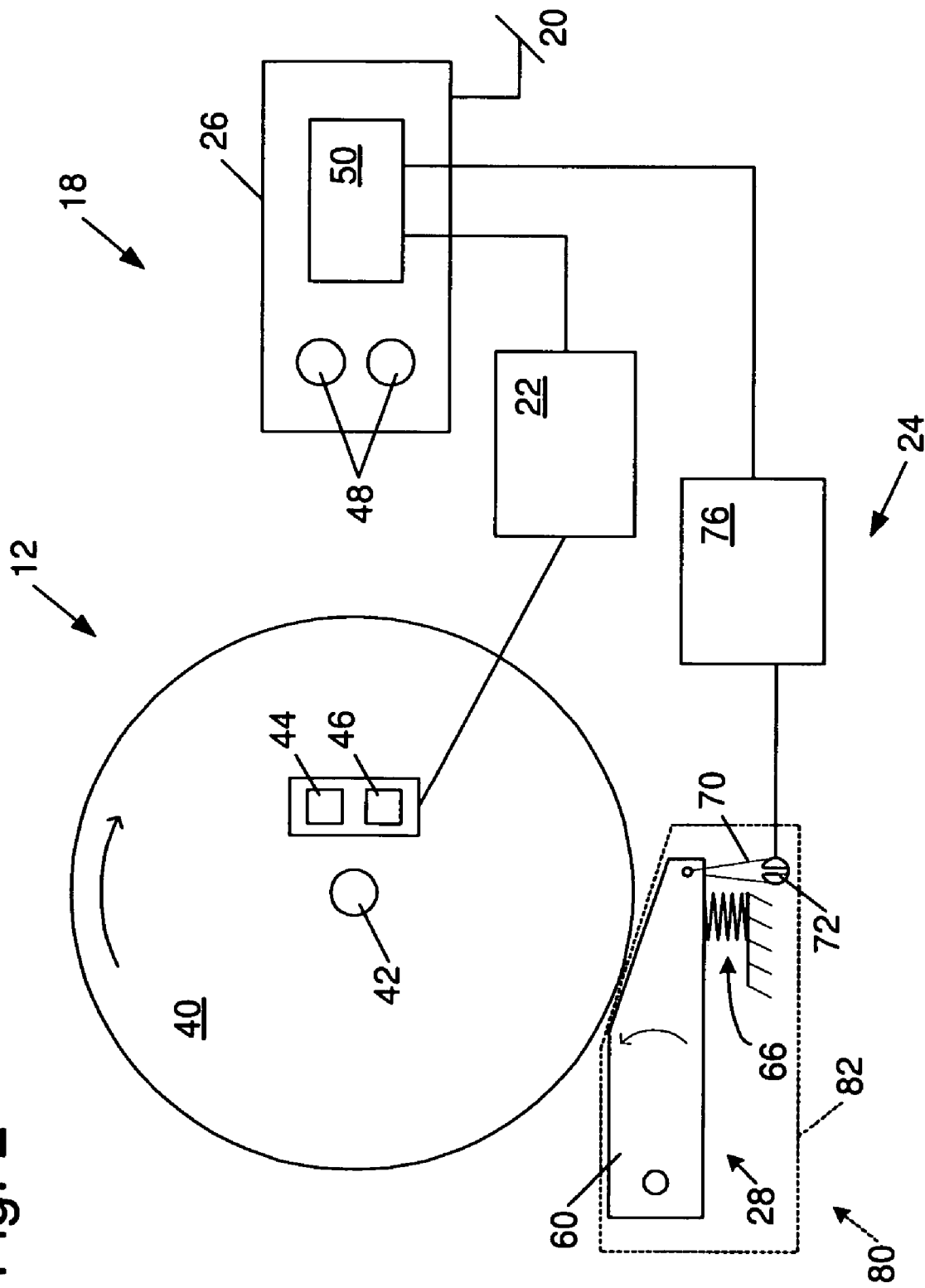
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, entitled "Logic Control For Fast Acting Safety System," filed Aug. 14, 2000 by SD3, LLC and U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, entitled "Firing Subsystem For Use In Fast Acting Safety System," filed Aug. 14, 2000 by SD3, LLC and U.S. Provisional Patent Application Ser. No. 60/225,170, entitled "Spring-Biased Brake Mechanism for Power Equipment," filed Aug. 14, 2000 by SD3, LLC, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC and U.S. Provisional Patent Application Ser. No. 60/225,212, entitled "Brake Positioning System," filed Aug. 14, 2000 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Provisional Patent Applications Ser. Nos. 60/182,866 and 60/157,340, the disclosures of which are herein incorporated by reference.

As discussed, safety system 18 includes a brake mechanism 28 that is adapted to stop the cutting tool, thereby preventing or reducing injury to the user. As also discussed previously, brake mechanism 28 may include at least one pawl 60 adapted to engage the cutting tool to stop the rotation thereof. For purposes of the following discussion, cutting tool 14 will be described in the context of a blade 40, such as on a table saw, miter saw, circular saw or the like. It should be understood that blade 40 may include single blades, such as plywood or carbide-tipped blades, or an assembly of several blades, such as a dado blade.

As discussed, pawl 60 may be made of any suitable material that is capable of quickly stopping the blade or other cutting tool within the desired time increment, such as less than 5 milliseconds, and preferably, 3 milliseconds or less. The above examples of thermoplastic and metallic materials have proven effective, although other materials may be used so long as they are able to stop the blade within the desired time increment. Preferably, the pawl is formed of a material that does not damage the machine, and even more preferably, the pawl is formed of a material that does not damage the cutting tool. The pawl may be formed by any suitable method, such as by cutting sheets of the desired material to size or by molding. Similarly, the pawls may be annealed to increase their strength.

It should be understood that the heavier the pawl, the more force it will take to urge the pawl into contact with the blade or other cutting tool within the selected time increment and the more restraining force that restraining mechanism 32 will need to exert to counteract the biasing mechanism. On the other hand, the pawl must have sufficient mass and strength to withstand the forces exerted upon the pawl by the blade. It should also be understood that the longer it takes for pawl 60 to engage the blade after detection of a dangerous, or triggering, condition by detection subsystem 22, the longer the blade will rotate and potentially cut the user's hand or other body part. Therefore, it is preferred that this time be minimized, such as by decreasing the distance pawl 60 must travel to engage the blade and increasing the speed at which the pawl moves to travel this distance. The speed at which the pawl travels is largely dependent upon the weight of the pawl, the force with which biasing mechanism 30 urges the pawl toward the blade upon release of restraining mechanism 32, and any friction in the mechanism.

There is not a specific pawl size, geometry or weight that is required to be suitable for use to stop the blade or other cutting tool. Instead, the size, geometry and weight may vary, depending upon such factors as the particular type of machine and cutting mechanism with which the pawl is used, the pawl material or combinations of materials, the corresponding structure of biasing mechanism 30 and restraining mechanism 32, etc. As such, the following discussion of materials, sizes and geometries are meant to provide illustrative examples of some suitable materials, geometries and sizes. Similarly, pawls may be formed with any combination of one or more of the subsequently discussed elements, subelements and possible variations, regardless of whether the elements, subelements and possible variations are shown together in the same figure.

The thickness of pawl 60 may vary. Thicknesses in the range of approximately ½ inch and approximately 1 inch have proven effective, although thicknesses outside of this range may be used so long as the pawl may reliably stop the blade. When thicker blades, such as dado blades are used, the pawl is more likely to have a thickness greater than 1 inch.

Figure 3:
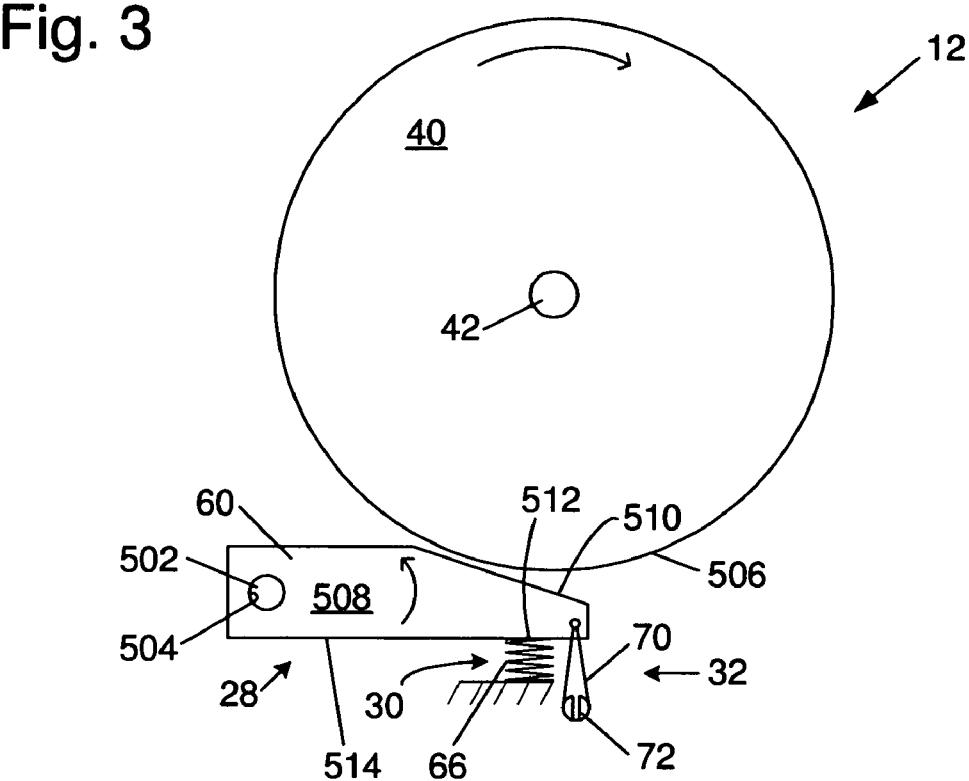
FIG. 3 is a side elevation view of a brake mechanism, including a pawl, according to the present invention.

Pawl 60 engages the blade to quickly stop the rotation of the blade. Pawl 60 may engage the blade in several different configurations, such as engaging the side of the blade or the teeth of the blade. As shown in FIG. 3, pawl 60 is pivotally mounted on an axle 502 that extends through a bore 504 in the pawl, and pawl 60 is adapted to pivot into the teeth 506 of blade 40 under the influence of a biasing mechanism, such as spring 66. It is within the scope of the invention that the pivotal pawls described herein may alternatively pivot with an axle upon which the pawl is secured, as opposed to pivoting about the axle. Other suitable biasing mechanisms are disclosed in copending U.S. Provisional Patent Application Ser. No. 60/225,170, entitled "Spring-Biased Brake Mechanism for Power Equipment," filed Aug. 14, 2000 by SD3, LLC, which is incorporated herein by reference. Preferably, pawl 60 is adapted to be self-locking, i.e., drawn into tighter engagement with the teeth of blade 40 due to the relative geometry of the blade and pawl as they are drawn together. For example, when blade 40 is spinning in the indicated direction in FIG. 3, the blade will draw the pawl into tighter engagement with the blade when the blade contacts the pawl.

The spacing from pawl 60 to blade 40 when the pawl is in its restrained, or cocked, position may vary. For example, this spacing may vary depending on the configuration of the particular cutting tool, the detection system, and/or the brake system. Preferably, this distance is minimized to reduce the time required for the pawl to travel across this distance and engage the blade. It has been found that a space of approximately ¹⁄₃₂-inch to ¼-inch between the pawl and blade provides suitable results. A spacing of approximately ⅛-inch has proven particularly effective, although larger and smaller distances may be used and are within the scope of the present invention. Because many cutting tools such as saw blades do not have precisely uniform dimensions, it may be necessary to position the pawl sufficiently away from the blade to account for variations or irregularities in a particular blade, such as described in copending U.S. Provisional Patent Application, which is entitled "Brake Positioning System," and which is incorporated herein by reference. Also it may be necessary to adjust the position of the pawl whenever a blade is replaced to account for variations between particular blades. For example, for circular saw blades having nominal diameters of 10-inches and nominal thicknesses of 0.125-inch, actual blades from various manufacturers or for different applications may have diameters that range between 9.5-inches and 10.5-inches and thicknesses that range between 0.075-inch and 0.15-inch.

In the illustrative embodiment of pawl 60 shown in FIG. 3, it can be seen that pawl 60 includes a body 508 with a contact surface 510 that is adapted to engage blade 40. Pawl 60 also includes an engagement member 512 that is adapted to be engaged by biasing mechanism 30. As shown engagement member 512 forms part of the face 514 of the pawl that faces generally away from the cutting tool. Engagement member 512 may also include a recess into or protrusion from the body of the pawl. In the mounting position shown in FIG. 3, pawl 60 pivots into the blade upon release of restraining mechanism 32, such as when the safety system sends a current through fusible member 70. When the pawl contacts the blade, the contact surface extends generally tangential to the blade, and the teeth of the blade embed into the pawl.

Figure 4:
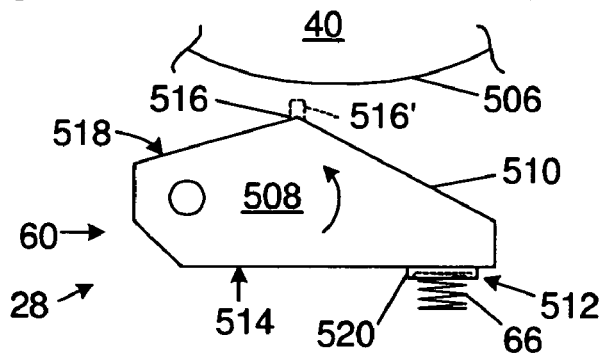
FIG. 4 is a side elevation view of a portion of another brake mechanism according to the present invention.

Another illustrative example of pawl 60 is shown in FIG. 4. As shown, the pawl is somewhat smaller than the pawl shown in FIG. 3. An advantage of a smaller pawl is that it will be lighter than a larger pawl constructed from the same material, and therefore it will not require as great of spring force to urge the pawl into the blade in a selected time interval as a heavier pawl. On the other hand, a smaller pawl will tend to, but not necessarily, have a smaller contact surface 510. In FIG. 4, the pawl includes a blade-engaging shoulder 516 that is adapted to engage the blade before the contact surface, or at least a substantial portion of the contact surface, engages the blade. Shoulder 514 may include a protrusion 516' that extends from the surface 518 of the pawl generally facing the blade. Shoulder 516 and/or protrusion 516' engage the blade prior to the contact surface of the pawl, and this contact quickly pivots the contact surface of the pawl into engagement with the blade. In essence, the shoulder or protrusion reduces the time and/or spring force required to quickly move the pawl into a position to stop the blade by using the blade momentum, transferred by contact with the shoulder, to draw the pawl into the blade. Also shown in FIG. 4 is another embodiment of engagement member 512, which as shown includes a collar 520 extinding from surface 514 and into which a portion of spring 66 is received. Collar 520 has an inner diameter that is greater than the diameter of the portion of the spring received therein. Collar 520 facilitates the positioning of the spring during assembly, or cocking, of the brake mechanism.

Figure 5:
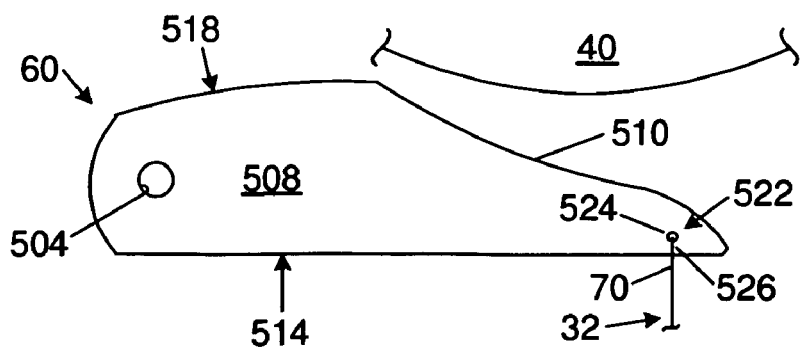
FIG. 5 is a side elevation view of another pawl according to the present invention.

Another illustrative example of a suitable pawl 60 is shown in FIG. 5. As shown, the pawl is somewhat larger than the previously illustrated pawls and includes a contact surface 510 that generally conforms to the outer diameter of the blade. Also shown in FIG. 5 is a mounting assembly 522 for restraining mechanism 32. As shown, mounting assembly 522 includes an aperture 524 through which a portion of the restraining mechanism, such as a portion of fusible member 70, extends. Fusible member 70 may also be described as extending around a portion 526 of the pawl. Other suitable fusible members and restraining mechanisms are disclosed in copending U.S. Provisional Patent Application Ser. No. 60/225,056, entitled "Firing Subsystem for Use in a Fast-Acting Safety System," filed Aug. 14, 2000 by SD3, LLC, which is incorporated herein by reference.

Figure 6:
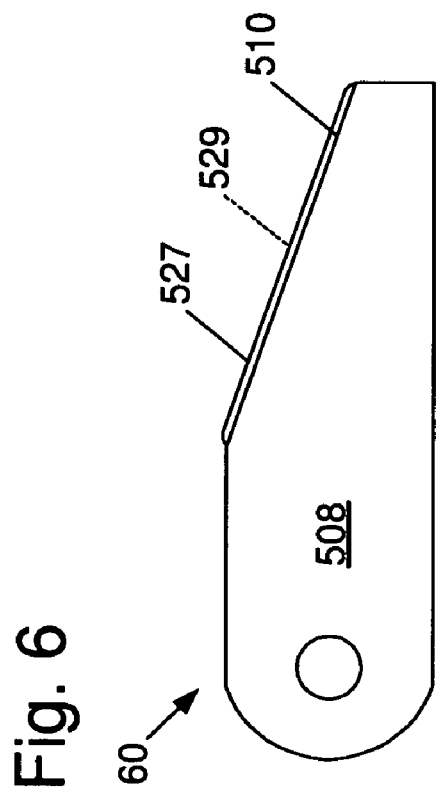
FIG. 6 is a side elevation view of another pawl according to the present invention.

To increase the gripping action of the pawls on the blade, the contact surfaces 510 of the pawls may be coated with a performance-enhancing material 527, such as shown in FIG. 6. An example of a performance-enhancing material is a relatively high-friction material such as rubber or a material that "tangles," or snares, in the teeth of the blade or other cutting tool, such as Kevlar cloth or metal mesh. Alternatively, the pawls may be constructed of a harder material than the blade and have a ridged surface to "bite" into the blade. Alternatively, or additionally, the pawl may be configured with grip structure 529 such as coatings of high-friction material, grooves, notches, holes, protuberances, etc., to further increase the gripping action of the pawls.

Figure 7:
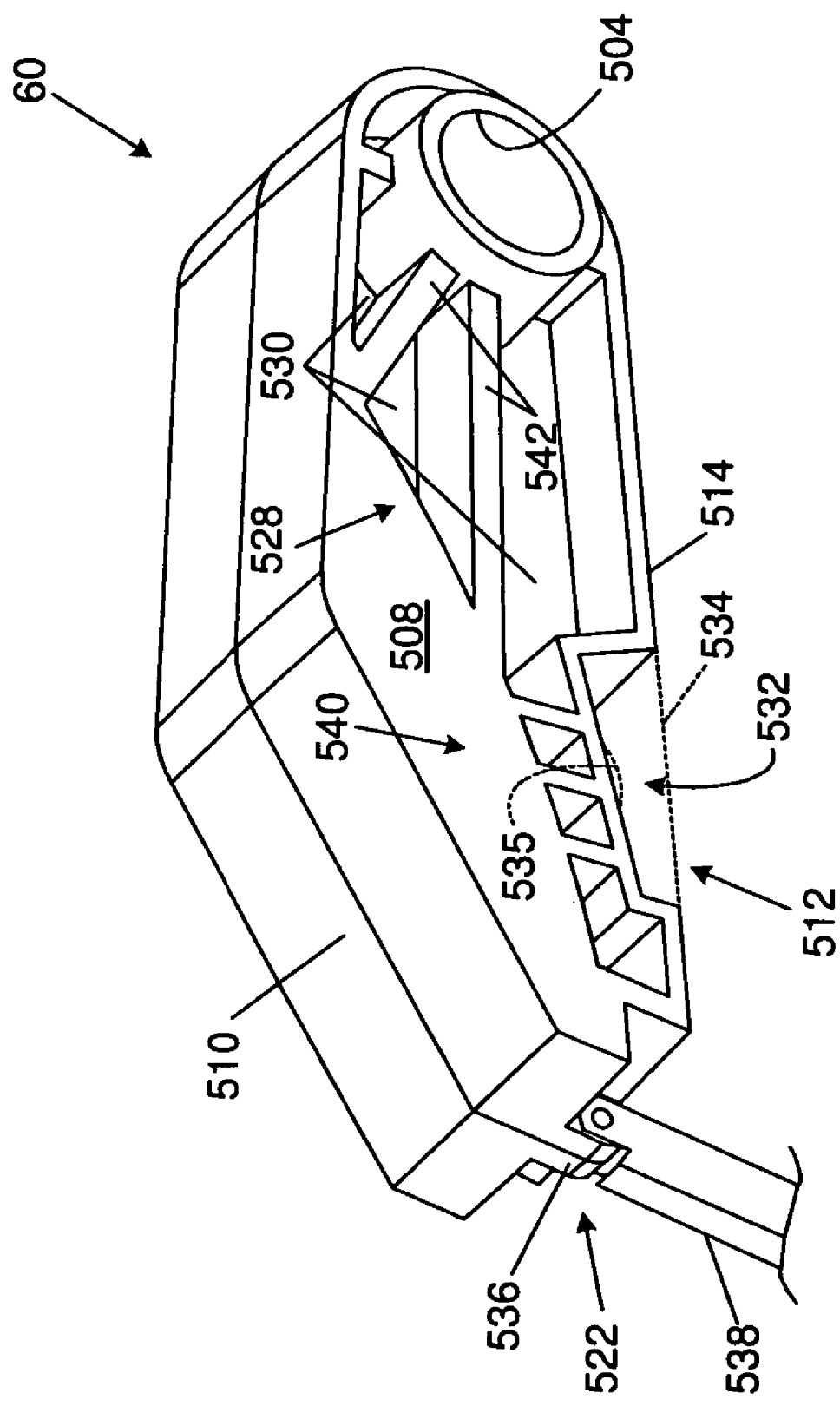
FIG. 7 is an isometric view of another pawl according to the present invention.

Pawl 60 may include one or more removed regions. These regions may take any suitable form, such as depressions that extend partially through the pawl or bores or other apertures that extend completely through the pawl. An example of a pawl showing plural removed regions 528 in the form of depressions 530 is shown in FIG. 7. The removed regions reduce the overall weight of the pawl, thereby decreasing the relative force that biasing mechanism 30 needs to exert on the pawl to move the pawl into contact with the blade within a selected time interval, as compared to a similar pawl of greater weight. Depressions, or recesses, 530 may also improve the grip of the pawl on the teeth of the blade by allowing the teeth to bite more deeply into the pawl.

An example of another embodiment of engagement member 512 is also shown in FIG. 7 in the form of a depression 532 that extends into the body 508 of the pawl and into which a portion of spring 66 extends. Depression 532 may be laterally open, or may include sidewalls 534, such as indicated in dashed lines. Also shown in FIG. 7 is a mount 535 adapted to be coupled to biasing mechanism 30. As shown, mount 535 takes the form of a projection around which a portion of a coil spring (such as spring 66 shown in FIG. 4) extends. It should be understood that mount 535 may be used independent of depression 532 and/or sidewalls 534. The pawl shown in FIG. 7 also shows another suitable embodiment of a mounting assembly 522 for restraining mechanism 32. As shown, the mounting assembly includes a mount 536 for a linkage 538, which is coupled to a fusible member that is not physically in contact with pawl 60.

The pawl shown in FIG. 7 may also be described as having a body 508 with a blade-engaging portion 540 and at least one region of reduced thickness compared to the blade-engaging portion. For example, the previously described depressions 530 have a reduced thickness compared to blade-engaging portion 540. The increased thickness of the blade-engaging portion provides additional strength to that portion of the pawl, while the reduced-thickness portions reduce the overall mass of the pawl. Pawl 60 may also be described as including one or more ribs, or supports 542 extending generally between bore 504 and blade engaging portion 540 to strengthen the pawl.

Figure 8:
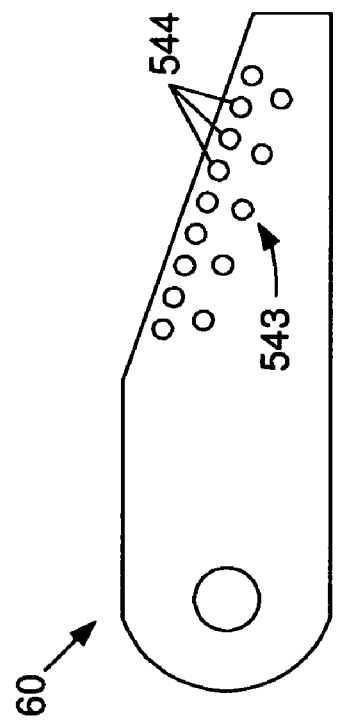
FIG. 8 is a side elevation view of another pawl according to the present invention.

An example of a pawl having plural removed regions 522 in the form of apertures 544 is shown in FIG. 8. Apertures 544 reduce the comparative weight of the pawl compared to a similar pawl that does not include apertures or other removed regions. Apertures 544 also provide regions into which the material forming pawl 60 may deform, or flow, into as the blade or other cutting tool strikes the pawl. Having these deformation regions reduces the stress to the pawl as it engages the blade. It should be understood that the size and positioning of the removed regions 522 discussed herein are for purposes of illustration and that these regions may be positioned in any suitable location on the pawl in a variety of shapes, sizes and configurations.

Figure 9:
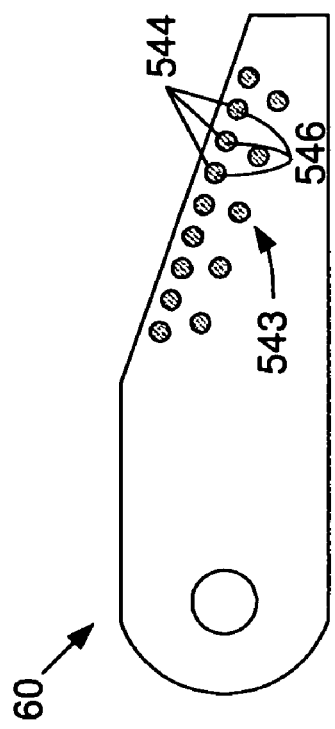
FIG. 9 is a side elevation view of another pawl according to the present invention.

A variation of the pawl of FIG. 8 is shown in FIG. 9, in which the apertures 544 have been filled with another material 546. It should be understood that some or all of the apertures may be partially or completely filled with material 546. For example, the body of pawl 60 may be formed from one of the previously described materials, with the apertures filled with another of the previously described materials or a material other than those described above. As a particular example, the body of the pawl may be formed from polycarbonate or ABS, with apertures 544 filled with aluminum or another suitable metal.

Figure 10:
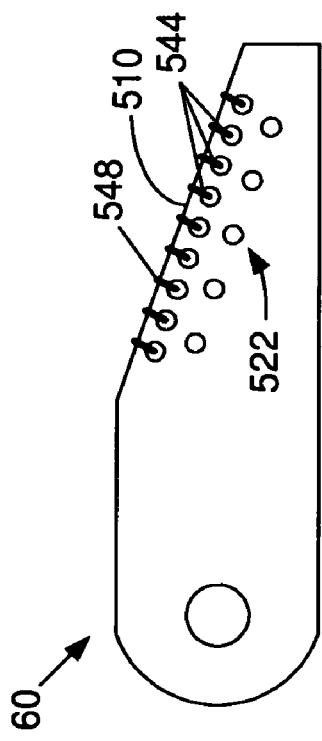
FIG. 10 is a side elevation view of another pawl according to the present invention.

Another variation of the pawl of FIG. 8 is shown in FIG. 10. In FIG. 10, pawl 60 includes a plurality of apertures 544 through which one or more wires 548 are passed. As shown, a single wire 548 is looped through the apertures and also extends across a portion of contact surface 510. Although illustrated schematically with the number of wires or wire strands shown in FIG. 10, there may preferably be many strands of wire, such as in the range of approximately 20 and approximately 500 strands. It should be understood that a "strand" of wire is meant to refer to a length of wire extending across the pawl, such as transverse to the plane of the blade or other cutting tool, regardless of whether the strand is connected to other strands or formed from the same unitary length of wire as other strands. Alternatively, the wire or wires could be threaded through one or more of the apertures without extending across the contact surface. An example of a suitable material for wire 548 is high tensile strength stainless steel, which is available in a variety of diameters. In experiments, diameters of 0.01 inch have proven effective, but larger or smaller diameter wires 548, as well as wires formed of other materials, may be used and are within the scope of the invention.

Figure 11:
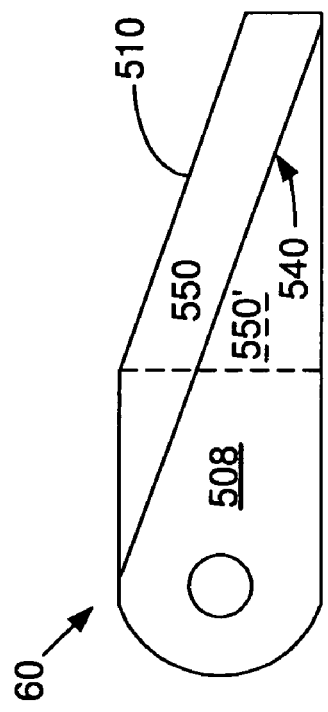
FIG. 11 is a side elevation view of another pawl according to the present invention.

Other forms of composite pawls according to the present invention include pawls formed from two or more regions of different materials. An example of such a composite pawl 60 is shown in FIG. 11, in which the body 508 of the pawl includes a region 550 of material that is a different material than the rest of the body and which forms at least a portion of blade-engaging portion 540. It should be understood that the region 550 may have a variety of shapes, including layers of generally uniform thickness, such as shown in solid lines in FIG. 11, or less uniform shapes, such as layer 550' shown in dashed lines in FIG. 11.

Figure 12:
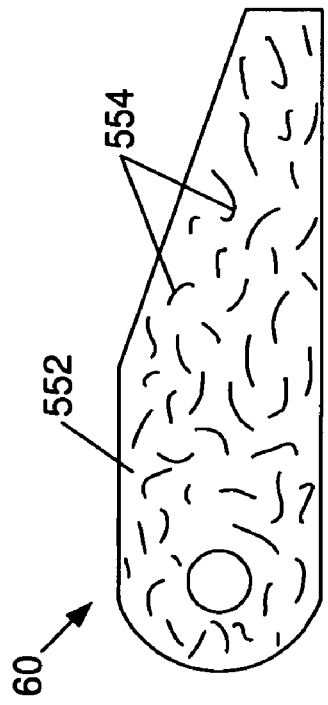
FIG. 12 is a side elevation view of another pawl according to the present invention.

Pawl 60 may also be formed from composites of materials, such as by layers of different materials or by impregnating or embedding a particular material of construction with another material to add or enhance a desired property. For example, a thermoplastic material may include a framework or dispersion of fibers or other materials. An example of a pawl constructed of such a composite is shown in FIG. 12, in which the body of the pawl is formed of a core material 552 into which a filler material 554 is added. Filler material 554 may take the form of particulates, fibers, woven fibers, pellets and the like.

Figure 13:
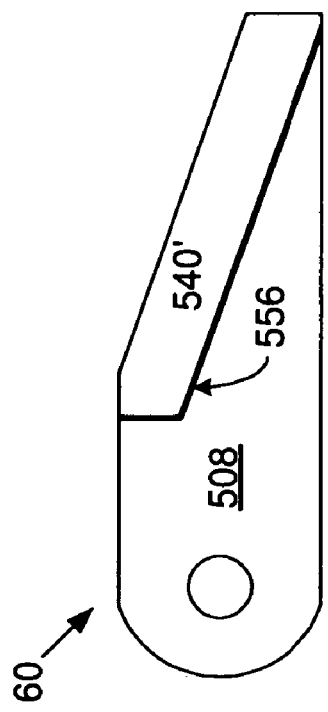
FIG. 13 is a side elevation view of another pawl according to the present invention.

Pawl 60 may also include a removable blade-engaging portion 540. This allows the pawl to be recharged for reuse after the pawl is used to stop blade 60 and the blade-engaging portion is damaged by the blade. It should be understood that "removable" means that the blade-engaging portion may be selectively removed and reattached to the rest of the pawl. An example of such a pawl is shown in FIG. 13, in which the pawl includes body 508 and removable blade-engaging portion 540'. Portion 540' may be formed of the same or a different material or combination of materials as body 508. Blade-engaging portion 540' may be attached to body 508 by any suitable attachment mechanism 556, which is only schematically illustrated in FIG. 13. Examples of suitable attachment mechanisms 556 include interlocking portions on the body and blade-engaging portion and/or mechanical linkages coupled between the body and blade-engaging portion.

Figure 14:
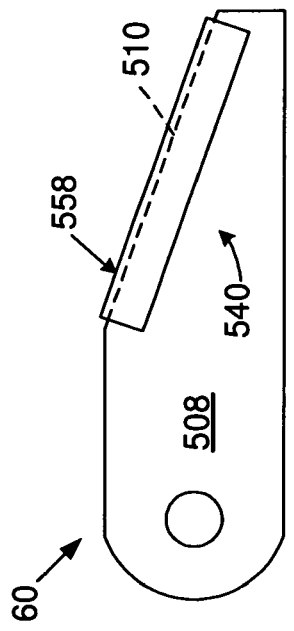
FIG. 14 is a side elevation view of another pawl according to the present invention.
Figure 15:
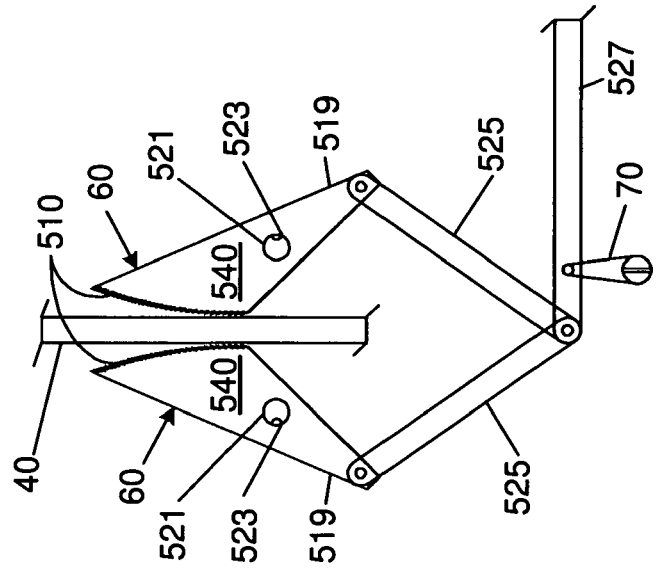
FIG. 15 is a side elevation view of another pawl according to the present invention.

In FIG. 14, pawl 60 includes a sheath, or cover, 558 that overlies at least the blade-engaging portion of the pawl. Sheath 558 is formed of a material that enhances the pawl's ability to stop blade 40, preferably without damaging the blade. For example, sheath 558 may be formed of Kevlar cloth. Similarly, such a material may be embedded into the thermoplastic or other material forming pawl 60, such as schematically illustrated in FIG. 12. Sheath 558 may extend completely or partially around the pawl, or alternatively may be partially embedded in the pawl, such as shown in FIG. 15. Furthermore, Kevlar cloth, or pieces thereof may be embedded into the thermoplastic or other material forming the pawl, such as discussed previously with respect to FIG. 12, regardless of whether this material extends across the blade-engaging portion of the pawl.

Figure 16:
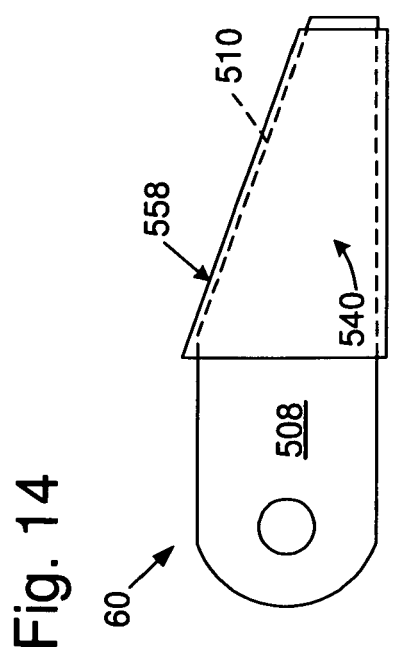
FIG. 16 is a side elevation view of another pawl according to the present invention.

A variation of a pawl that includes sheath 558 is shown in FIG. 16. In FIG. 16, the body of the pawl defines a frame 560 that includes spaced-apart side walls 562 defining a channel 564 therebetween. Sheath 558 extends across the channel and is positioned to engage and stop the blade as the pawl is urged into the blade.

Figure 17:
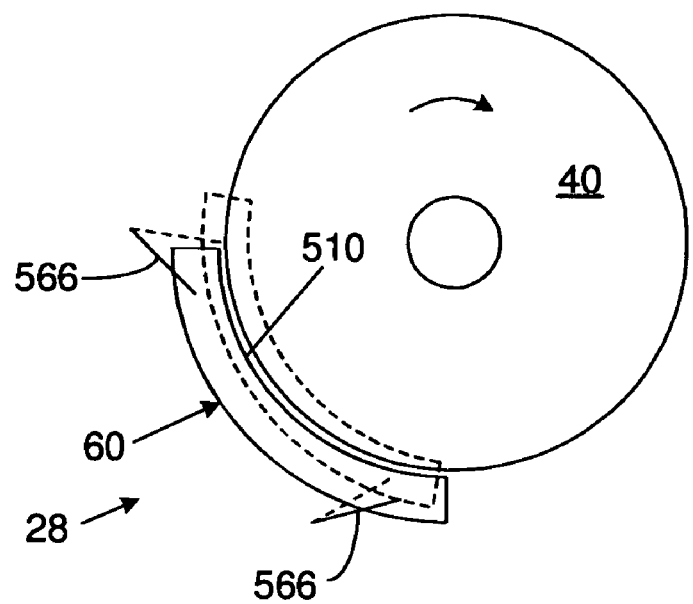
FIG. 17 is a side elevation view of another brake mechanism according to the present invention.
Figure 18:
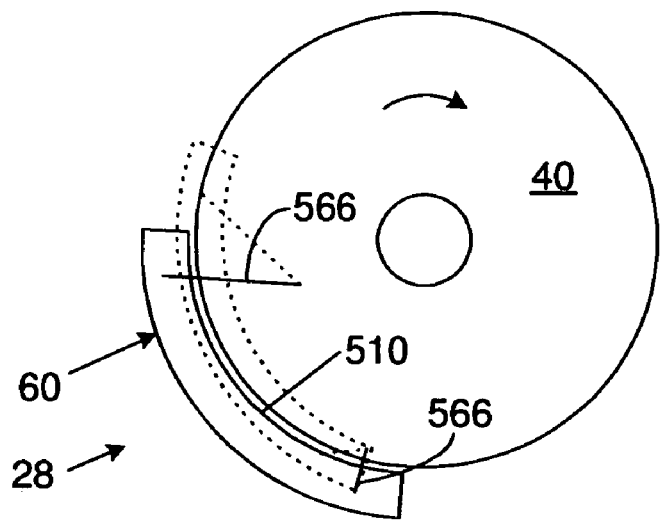
FIG. 18 is a side elevation view of another brake mechanism according to the present invention.
Figure 19:
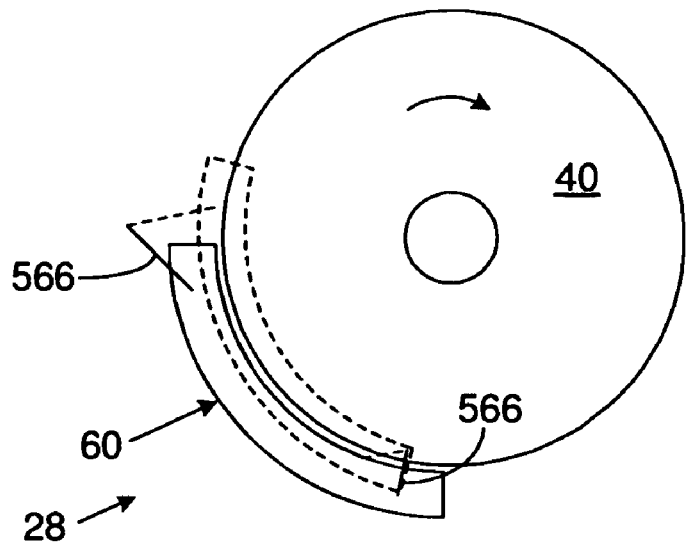
FIG. 19 is a side elevation view of another brake mechanism according to the present invention.

When pawl 60 is mounted to pivot into engagement with a blade or other cutting tool, the pawl may include more than one pivot axis. An example of such a pawl is shown in FIGS. 17-19, in which the pawl is mounted on a pair of pivot arms 566. As shown, pawl 60 has an elongate contact surface 510 that engages a large portion of the blade. Arms 566 may have the same or different lengths, and can be mounted to pivot anchors (not shown) positioned outside or inside the perimeter of the blade. An advantage of a pawl with an elongate contact surface is that the force exerted by the pawl is distributed across a larger portion of the blade, thereby allowing the blade to be stopped more quickly. The longer contact surface can also be used to reduce the chance of damage to the blade because the braking force is spread over more teeth.

In FIG. 17, arms 566 are mounted to suitable portions of machine 10 distal the blade relative to pawl 60, while in FIG. 18, the arms are mounted proximate the blade relative to pawl 60. In FIG. 19, one of the pivot arms extends distal the blade, while the other extends proximate the blade relative to the pawl. An advantage of pivot arms that extend toward, or proximately, the blade relative to the pawl is that the pawl cannot be pivoted beyond a point after which the pawl will pivot away from the blade rather than toward the blade. In the embodiment of pawl 60 shown in FIG. 18, for example, the pawl will always be drawn into tighter engagement with the blade when the blade is rotating in the direction shown and strikes the pawl.

It should be understood that the previously described axle 502 or other structure to which the pawls are mounted may be fixed relative to the housing of the machine. In embodiments of the machine in which the position of the blade is adjustable, the pawl is preferably mounted to move with the blade as the blade's position is adjusted. This latter arrangement ensures that the pawl is maintained in a predetermined position relative to the blade. Similarly, the charging plates are preferably mounted to move with either the blade or arbor to maintain a predetermined and constant spacing thereto.

Figure 20:
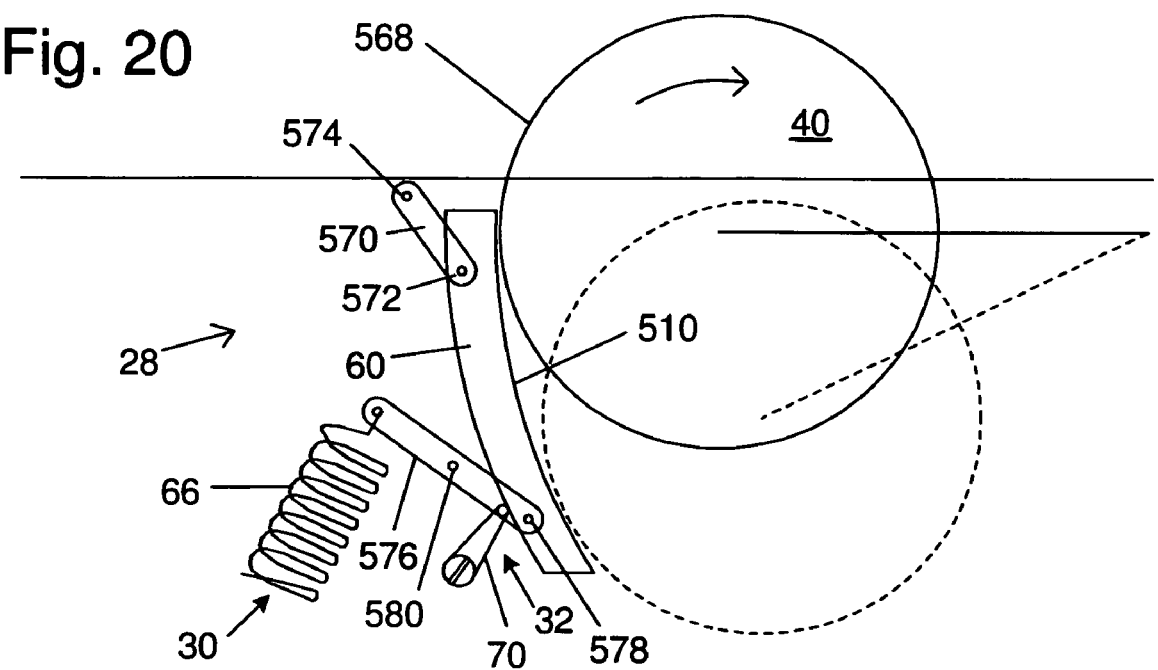
FIG. 20 is a side elevation view of another brake mechanism according to the present invention.
Figure 21:
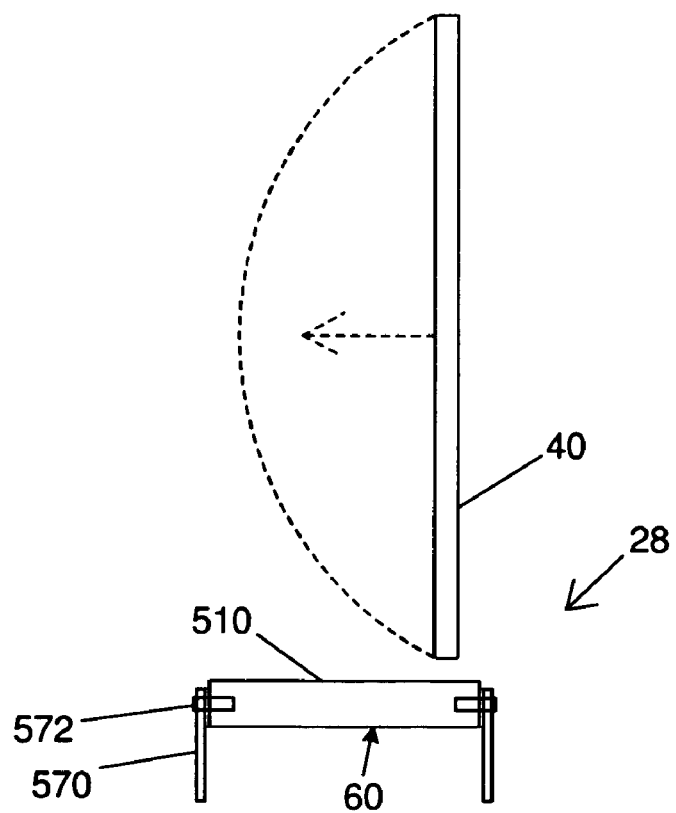
FIG. 21 is a top plan view of the brake mechanism of FIG. 20.

Alternatively, the pawl may be mounted on a portion of the machine that does not adjust with the blade, but in a mounting orientation suitable for use with the blade regardless of the blade's mounting position. An illustrative example of such a "stationary" pawl is shown in FIGS. 20 and 21. By "stationary," it is meant that the position of the pawl does not move with the blade as the relative position of the blade is moved. However, upon actuation of the reaction subsystem, pawl 60 will still move into engagement with the blade. Alternatively, with machines in which the blade may raise and lower as well as tilt, the pawl may be adapted to move with one adjustment, such as tilting with the blade, but remain fixed with the other, such as when the blade is raised or lowered.

As shown in FIGS. 20 and 21, pawl 60 is elongate and sized and shaped to extend along the outer perimeter 568 of blade 40 as the blade is adjusted vertically. Similarly the width of pawl 60 is sized to extend the breadth of the incline of blade 40. As shown in FIGS. 20 and 21, pawl 60 is mounted generally parallel with the vertical axis of travel of the blade, and generally normal to the axis of incline of the blade. As a result, the spacing between the blade and contact surface 510 remains constant regardless of the position or orientation of the blade.

The upper end portion of pawl 60 is pivotally attached to upper pivot arms 570 by pivot pins 572 that pass through one end of arms 570 into the sides of the pawl. The other ends of pivot arms 570 are pivotally attached to one or more mounts (not shown), by pivot pins 574. The lower end portion of pawl 60 is pivotally attached to lower pivot arms 576 by pivot pins 578 that pass through one end of arms 576 into the sides of the pawl. The lower pivot arms are pivotally attached to mounts (not shown) by pivot pins 580. Biasing mechanism 30, such as one or more springs 66, is attached to the lower pivot arms on the side of pivot pins 580 opposite pivot pins 578. Thus, pawl 60 is configured to pivot toward or away from blade 40. Upon release of restraining mechanism 32, such as fusible member 70, the biasing mechanism urges the upper ends of pivot arms 576 downward, thereby drawing the lower end of the pivot arms and the corresponding end portion of pawl 60 into engagement with the blade.

Pivot arms 570 and 576 are sized and arranged such that pawl 60 cannot pivot up past the blade without striking the edge of the blade. When the pawl strikes the blade while the blade is rotating, the movement of the blade causes the pawl to continue pivoting upward until the pawl is firmly wedged between the blade and pivot arms, thereby stopping the blade. The contact surface 510 of the pawl may be textured, coated, etc., to enhance the gripping action between the pawl and the blade.

Pawl 60 is biased upward to pivot toward the blade by biasing mechanism 30, which for example includes one or more springs 66 that are anchored to the saw frame or other suitable mounting structure. Thus, when the pawl is free to pivot, springs 66 drive the pawl quickly toward the blade. Fusible member 70 is connected to one or both of lower pivot arms 576 to hold the pawl away from the blade. The fusible member is sized to hold the pawl spaced slightly away from the edge of the blade. However, when a sufficient current is passed through the fusible member the fusible member will melt, causing the pawl to pivot toward the blade under the urging of biasing mechanism 30.

It will be appreciated that many variations to the exemplary embodiment depicted in FIGS. 20 and 21 are possible within the scope of the invention. For example, the pawl may be configured to pivot toward the blade solely due to gravity. Alternatively, springs 66 may be compression springs which normally hold the pawl away from the blade until it is pivoted upward under the force of another spring, an explosive charge, a solenoid, gas pressure, etc. Further, the pawl may be mounted on the other side of the blade to pivot downward into the blade under the force of a spring, an explosive charge, a solenoid, gas pressure, etc.

Figure 22:
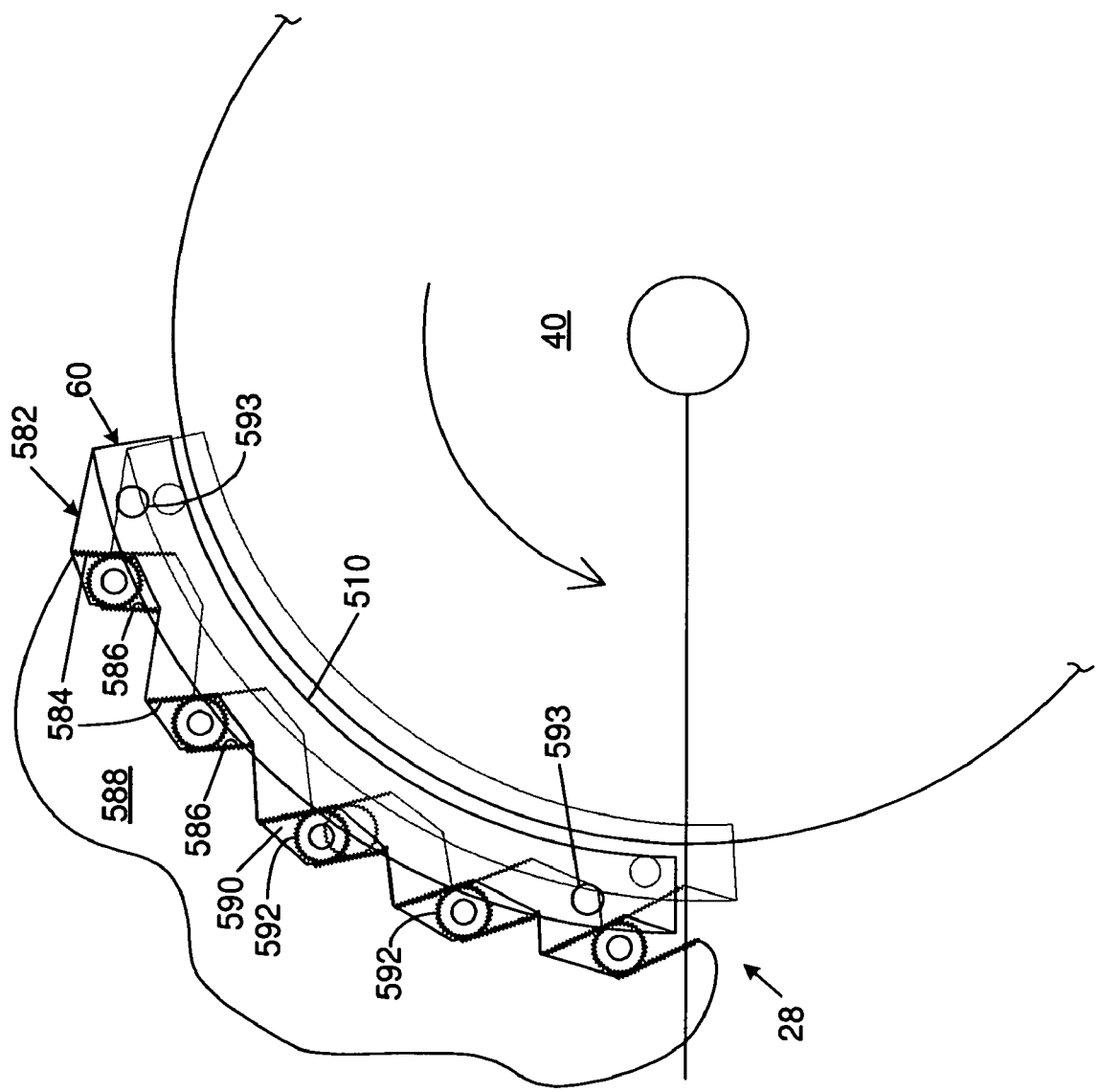
FIG. 22 is a side elevation view of a brake mechanism according to the present invention with a translational pawl.

Another example of a suitable pawl 60 is shown in FIG. 22. As shown, pawl 60 includes a rearward portion 582 facing generally away from contact surface 510. Portion 582 includes a plurality of race portions 584 that in cooperation with a corresponding plurality of race portions 586 on a suitable mounting structure 588 forming part of machine 10, define races 590 within which rollers 592 are housed. Toothed rollers 592 are rotatable within races 590 and direct the translational movement of pawl 60 toward blade 40 when the blade strikes pawl 60. The rollers also reduce the friction of moving the pawl under braking load relative to a sliding surface. Preferably, pawl 60 includes guide pins 593 that travel within tracks (not shown), which define the range of translational positions of pawl 60 while maintaining the rollers in contact with the races.

Figure 23:
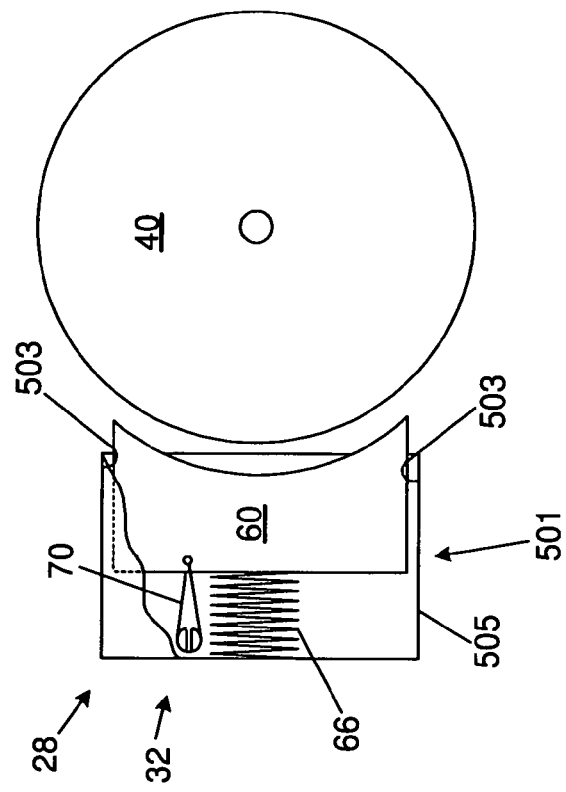
FIG. 23 is a side elevation view of another brake mechanism with a translational pawl according to the present invention.

In FIG. 23, another illustrative embodiment of a brake mechanism 28 that includes a pawl 60 that moves via translation into engagement with the blade or other cutting tool is shown. Pawl 60 includes a contact surface that preferably, but does not necessarily, conform to the outer diameter of blade 40. Pawl 60 is retained in its cocked, or restrained, position by restraining mechanism 32, which as shown, includes one or more fusible members 70. Preferably, braking mechanism 28 includes guide structure 501 that defines a track 503 along which the pawl travels as it is urged toward the blade or other cutting tool by biasing mechanism 30. An example of such a guide structure is shown in FIG. 23, in which the guide structure includes a housing 505 into which the pawl is at least partially received in its cocked, or restrained position, and from which the pawl at least partially projects upon release of restraining mechanism 32. Much like a piston moving within a cylinder, pawl 60 travels in a translational path defined by the inner dimensions of housing 505 under the urging of biasing mechanism 30.

Figure 25:
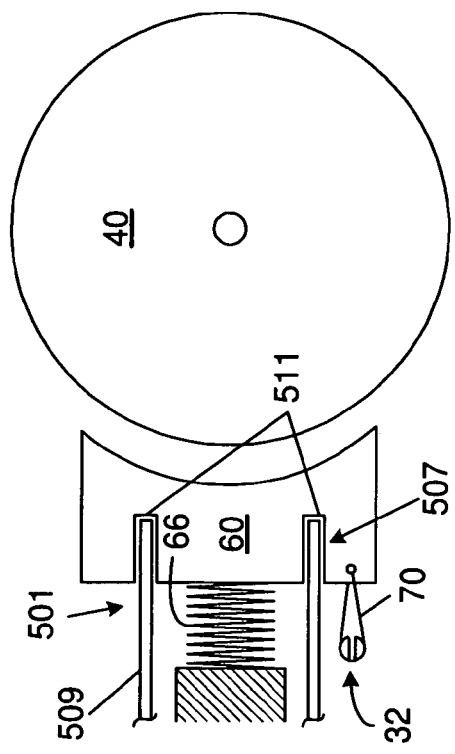
FIG. 25 is a side elevation view of another brake mechanism with a translational pawl according to the present invention.
Figure 24:
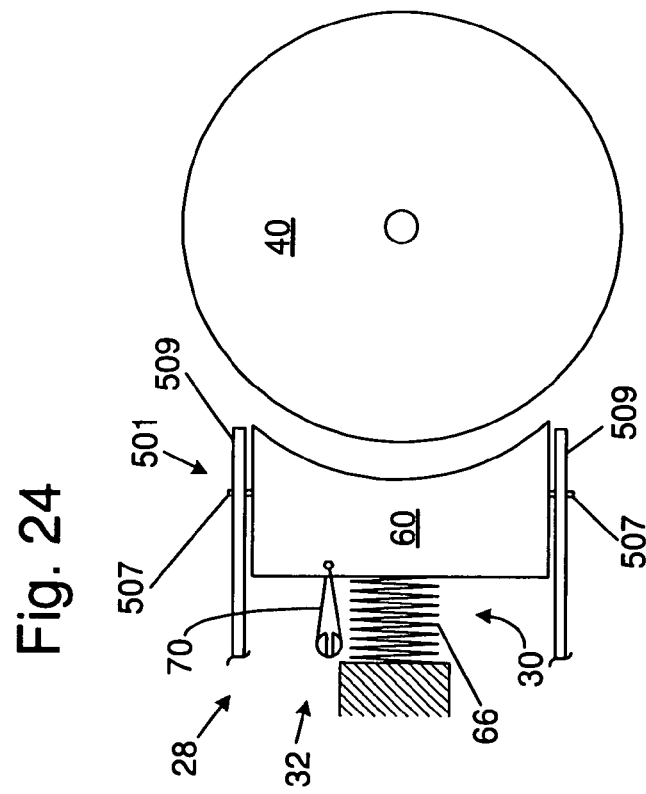
FIG. 24 is a side elevation view of another brake mechanism with a translational pawl according to the present invention.

Other illustrative examples of brake mechanisms 28 with translational pawls are shown in FIGS. 24 and 25. In FIG. 24, guide structure 501 includes two or more guide-engaging members 507 that project from pawl 60 to engage a corresponding number of guides 509. Guides 509 are spaced apart from the pawl and define the translational path of the pawl. In FIG. 25, pawl 60 includes internal guide-engaging members 507, such as one or more internal bores 511 extending parallel to the translational path of the pawl. A corresponding number of guides 509 extend at least partially within the bores to define the travel path of the pawl. In FIGS. 23-25, pawls 60 are urged along a translational path directly into blade 40. It should be understood that the pawls and/or the guide structure may be inclined at an angle relative to the blade, such as to counteract the angular momentum of the blade or to utilize the braking force to draw the pawl more tightly against the blade.

Figure 26:
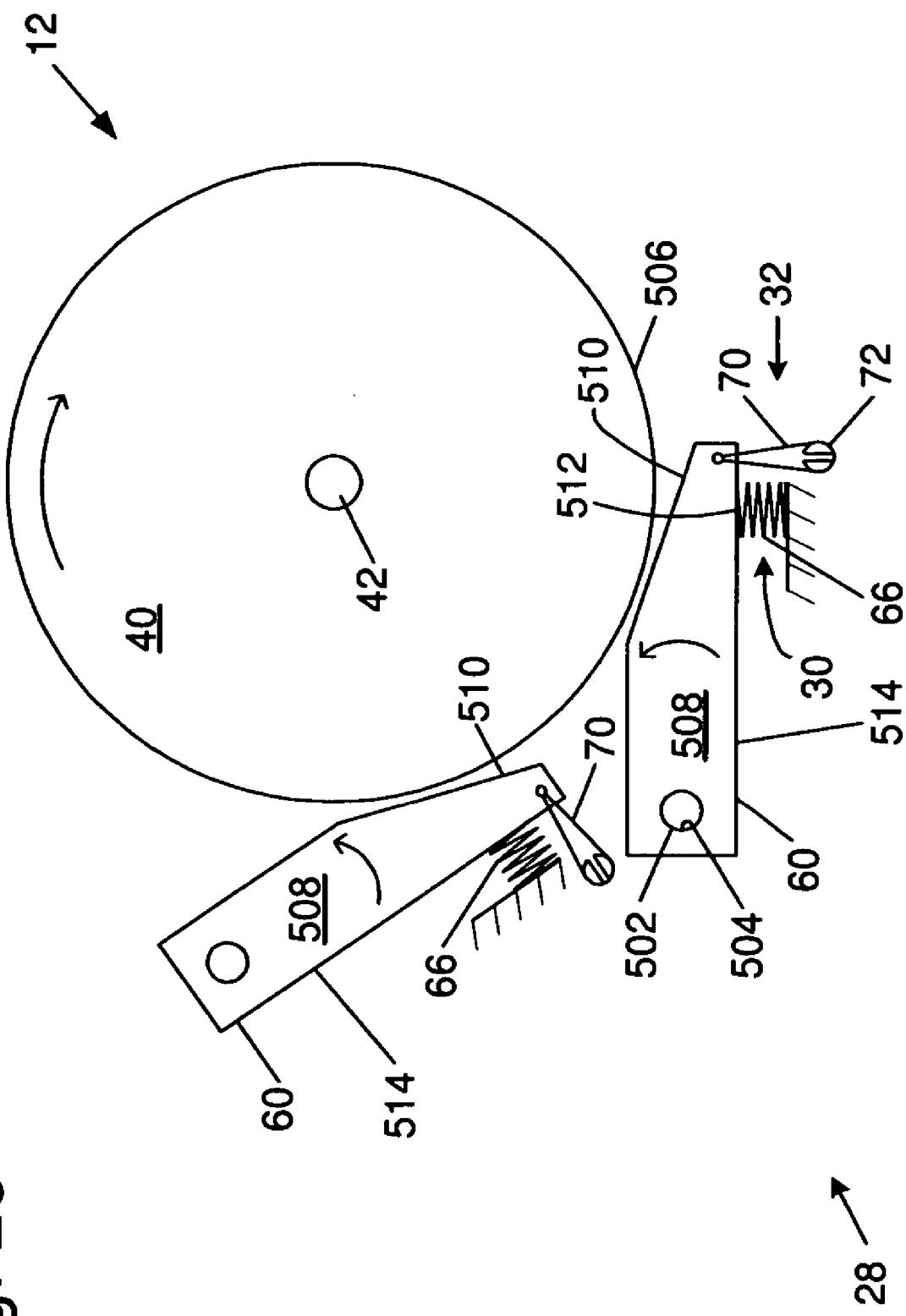
FIG. 26 is a side elevation view of a brake mechanism that includes plural pawls.

Although the exemplary embodiments are described above in the context of a single brake pawl that engages the teeth of a blade, the brake system may incorporate a brake mechanism with two or more pawls that engage two or more locations on the perimeter of the blade to decrease the stopping time and/or spread the stopping forces. An example of such a brake mechanism is shown in FIG. 26, in which the brake mechanism includes two spaced-apart pawls 60 adapted to engage the perimeter of blade 40. Pawls 60 are only schematically illustrated in FIG. 26 and could include any of the previously described pawl or pawls incorporating one or more of the features, elements, subelements and variations described above. The pawls may be released from their cocked, or restrained, positions by a common release mechanism, or each pawl may have its own release mechanism. When brake mechanism 28 includes plural pawls, it may be desirable to position the pawls on opposite sides of the arbor about which the blade rotates to reduce the load on the arbor when the brake mechanism is actuated and the pawls engage the blade.

Figure 27:
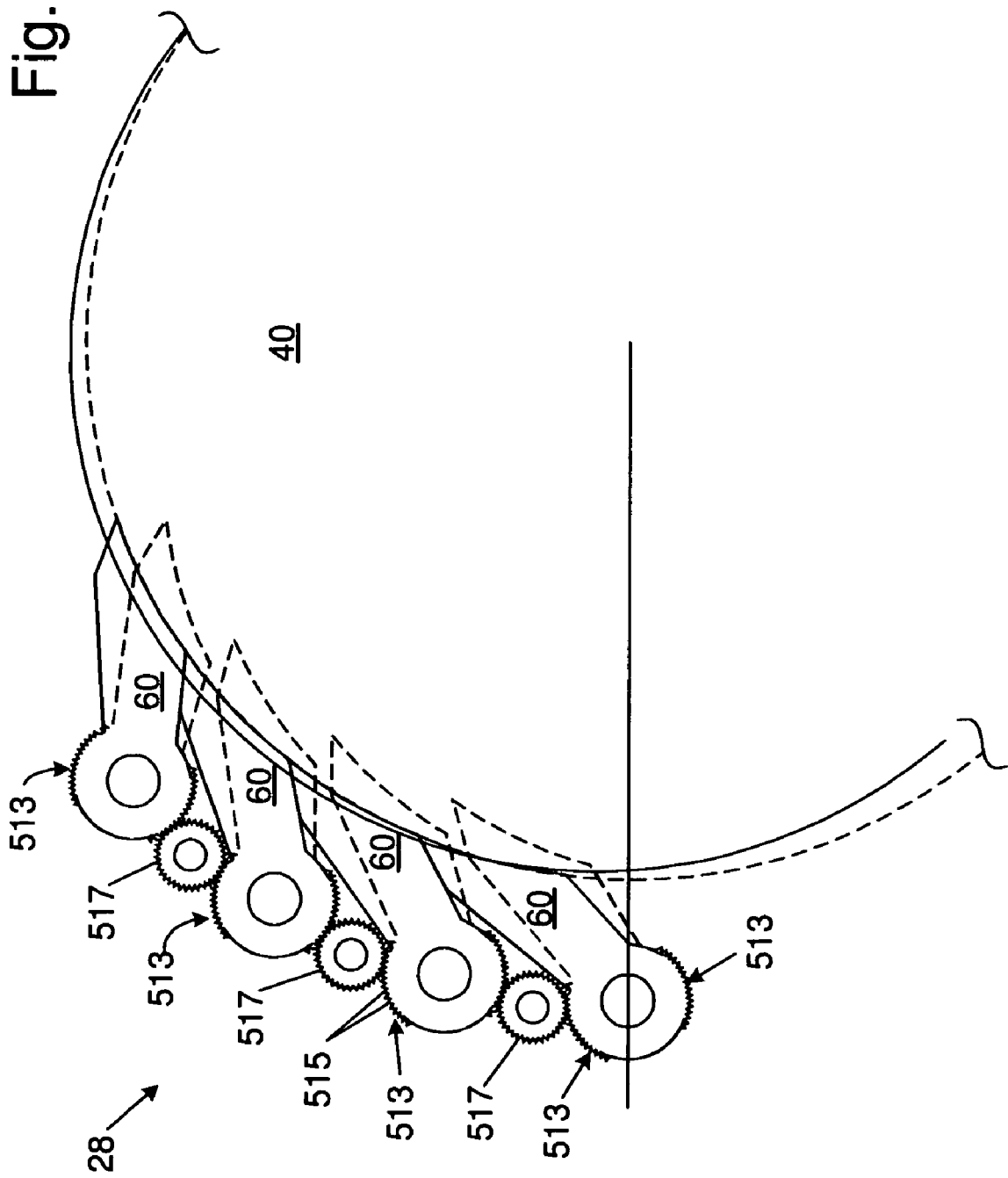
FIG. 27 is a fragmentary side elevation view of another brake mechanism that includes plural pawls.

When brake mechanism 28 includes plural pawls, the pawls may also be constrained or interconnected to act together. An example of such a brake mechanism is shown in FIG. 27, in which the brake mechanism includes a plurality of interconnected pawls 60. As shown, each pawl 60 includes one or more toothed regions 513 having a plurality of teeth 515. Regions 513 of adjacent pawls 60 are interconnected by toothed gears, or linkages, 517 that communicate the rotation of one pawl to the other pawls so that the pawls move as a unit. It should be understood that one or more of the pawls or gears are coupled to a suitable biasing mechanism and restraining mechanism to bias the pawls into contact with blade 40 and to selectively restrain the movement of the pawls until the reaction subsystem is actuated. In a variation of the brake mechanism shown in FIG. 27, gears 517 may be omitted, in favor of links interconnecting the pawls.

Figure 28:
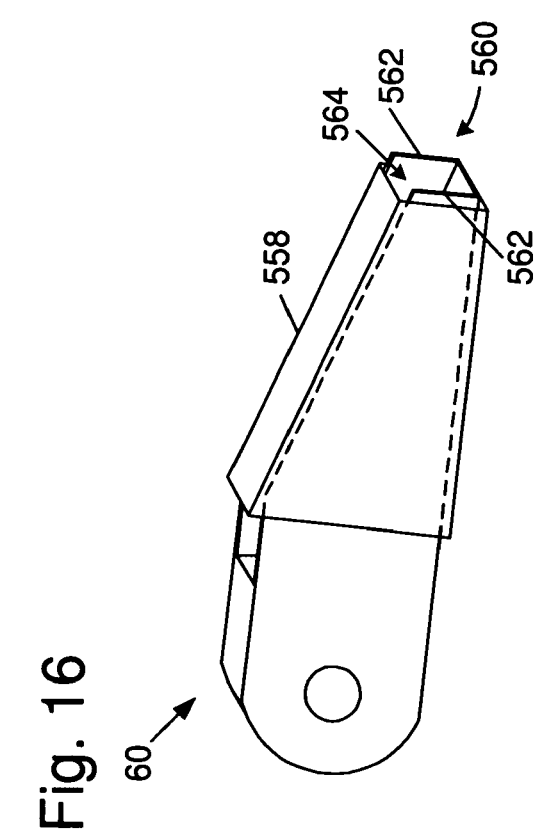
FIG. 28 is a top plan view of another brake mechanism according to the present invention.

As discussed, the pawl or pawls of brake mechanism 28 may contact any suitable portion of blade 40 or other cutting tool 14. In the illustrative embodiments shown in FIGS. 2-27, the pawls were mounted to engage the teeth or outer perimeter of the blade. An example of another suitable contact portion of the blade is the side of the blade. Specifically, brake mechanism 28 may include two or more pawls adapted to engage opposed sides of the blade. An example of such a brake mechanism is illustrated in FIG. 28. As shown, pawls 60 are pivotally mounted on either side of blade 40. Each pawl includes a blade-engaging portion 540 adjacent the blade, and a distal portion 519. The pawls are pivotally mounted on pins 521 that pass through pivot apertures 523 in the pawls intermediate the blade-engaging portion and the distal portion. Lever arms 525 are coupled to distal portions 519. Thus, when the lever arms of each pawl are pivoted upward (as viewed in FIG. 28), the blade-engaging portions close together. The pawls are mounted relative to the blade so that the contact surfaces pivot toward the blade in the direction of blade travel. Once the pawls contact and grip the blade, they continue to pivot inward pulled by the downward motion (as viewed in FIG. 28) of the blade. As a result, the blade is pinched more and more tightly between the contact surfaces 510 of the pawls until the pawls can close no further, at which point the blade is stopped between the pawls.

To ensure that both pawls close together on the blade, a linkage 527 is attached, at one end, to lever arms 525. Linkage 527 is coupled to a biasing mechanism, not shown, which urges the pawls into contact with the blade, through force exerted through linkage 527 and lever arms 525.

It will be appreciated that the dual-pawl system described above may be implemented with many variations within the scope of the invention. For example, the linkage may be driven upward by any of the other actuating means described above, including an explosive charge, solenoid, compressed gas, etc. As another example, one or more pawls may be positioned to contact only one side of the blade. Additionally, the linkage may be omitted, and each pawl actuated by a separate spring, explosive charge, solenoid, etc. Similarly, although a circular blade 40 was used to illustrate one type of cutting tool for which the brake system may be used, it may also be used with other shapes of blades, such as blades used in jointers, shapers and band saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A method for minimizing potential injuries from a woodworking machine having a rotatable blade with one or more teeth, the method comprising:
    detecting one or more dangerous conditions between a person and the blade; and
    stopping the rotation of the blade if one of the dangerous conditions is detected by pivoting a brake into the teeth of the blade so that at least one tooth of the blade cuts into the brake to draw the brake into tighter engagement with the blade.

2. The method of claim 1 where the limitation of stopping the rotation of the blade is performed by pivoting a brake at least partially formed of metal into the teeth of the blade.

3. The method of claim 1 where the limitation of stopping the rotation of the blade is performed by pivoting a brake at least partially formed of plastic into the teeth of the blade.

4. The method of claim 1 where the limitation of stopping the rotation of the blade is performed by pivoting a brake at least partially formed of aluminum into the teeth of the blade.

5. The method of claim 1 where the teeth of the blade have a given hardness and where the limitation of stopping the rotation of the blade is performed by pivoting a brake with a blade-contacting region having a hardness less than the hardness of the teeth.

6. The method of claim 1 where the teeth of the blade are metal and have a given hardness, where the brake includes a blade-contacting region made at least partially of metal, and where the metal of the blade-contacting region has a hardness less than the hardness of the teeth.

7. The method of claim 1 where the teeth of the blade have a given hardness, where the brake includes a blade-contacting region made at least partially of aluminum, and where the aluminum of the blade-contacting region has a hardness less than the hardness of the teeth.

8. The method of claim 1 where the teeth of the blade have a given hardness, where the brake includes a blade-contacting region made at least partially of plastic, and where the plastic of the blade-contacting region has a hardness less than the hardness of the teeth.

9. A method for minimizing potential injuries from a woodworking machine having a rotatable blade with one or more teeth, the method comprising:

detecting one or more dangerous conditions between a person and the blade; and decelerating the rotation of the blade if one of the dangerous conditions is detected by pivoting a pawl into the teeth of the blade so that at least one tooth of the blade cuts into the pawl to draw the pawl into tighter engagement with the blade.

10. The method of claim 9 where the limitation of decelerating the rotation of the blade is performed by pivoting a pawl at least partially formed of metal into the teeth of the blade.

11. The method of claim 9 where the limitation of decelerating the rotation of the blade is performed by pivoting a pawl at least partially formed of plastic into the teeth of the blade.

12. The method of claim 9 where the limitation of decelerating the rotation of the blade is performed by pivoting a pawl at least partially formed of aluminum into the teeth of the blade.

13. The method of claim 9 where the teeth of the blade have a given hardness and where the limitation of decelerating the rotation of the blade is performed by pivoting a pawl with a blade-contacting region having a hardness less than the hardness of the teeth.

14. The method of claim 9 where the teeth of the blade are metal and have a given hardness, where the pawl includes a blade-contacting region made at least partially of metal, and where the metal of the blade-contacting region has a hardness less than the hardness of the teeth.

15. The method of claim 9 where the teeth of the blade have a given hardness, where the pawl includes a blade-contacting region made at least partially of aluminum, and where the aluminum of the blade-contacting region has a hardness less than the hardness of the teeth.

16. A method for minimizing potential injuries from a woodworking machine having a rotatable blade with one or more teeth, the method comprising:

detecting one or more dangerous conditions between a person and the blade; and a step for stopping the rotation of the blade if one of the dangerous conditions is detected by pivoting a brake into the teeth of the blade so that the teeth cut into the brake to draw the brake into tighter engagement with the blade.

\* \* \* \* \*